United States Patent [19]
Arano et al.

[11] Patent Number: 5,642,459
[45] Date of Patent: *Jun. 24, 1997

[54] DIGITAL SIGNAL RECORDING METHOD AND DIGITAL VIDEO TAPE RECORDER

[75] Inventors: Yukari Arano; Ken Onishi, both of Nagaokakyo, Japan

[73] Assignee: Mitsubishi Denki Kabushiki Kaisha, Tokyo, Japan

[ * ] Notice: The term of this patent shall not extend beyond the expiration date of Pat. No. 5,499,106.

[21] Appl. No.: 957,084

[22] Filed: Oct. 6, 1992

Related U.S. Application Data

[63] Continuation of Ser. No. 362,243, Jun. 6, 1989, abandoned.

[30] Foreign Application Priority Data

| Jun. 7, 1988 | [JP] | Japan | 63-139811 |
| Jun. 10, 1988 | [JP] | Japan | 63-144464 |
| Jul. 19, 1988 | [JP] | Japan | 63-179889 |

[51] Int. Cl.⁶ .......................... H04N 5/782; H04N 5/928
[52] U.S. Cl. .............................. 386/104; 386/96
[58] Field of Search .................... 358/341, 343, 358/310, 335; 360/19.1, 32, 33.1, 8, 28; 386/46, 96, 104, 75; H04N 5/782

[56] References Cited

U.S. PATENT DOCUMENTS

| 4,303,950 | 12/1981 | Taniguchi et al. | 360/19.1 |
| 4,463,387 | 7/1984 | Hashimoto et al. | 358/310 |
| 4,477,844 | 10/1984 | Nakano et al. | |
| 4,488,182 | 12/1984 | Takahashi et al. | |

(List continued on next page.)

FOREIGN PATENT DOCUMENTS

| 2929446C2 | 8/1984 | Germany . |
| 2073935 | 10/1981 | United Kingdom . |

OTHER PUBLICATIONS

Product Information Manual, D–2. Composite Digital DVR–10, Sony Corporation; pp. 15–21; "IV. The D–2 Format and the Advanced Technology of the DVR10"; published: Apr. 1988.
European Patent Application 155101 to Endo et al.
Great Britain Patent Application No. 2,092,814–A to Machida et al filed Feb. 10, 1982.
European Patent Application No. 2,076,251–A to Hashimoto et al/ filed Apr. 10, 1981 .
Great Britain Patent Application 2,166,745A to Watanabe filed Aug. 28, 1985.
European Patent Application No. 0155101 to Kazuhito et al filed Feb. 21, 1985.
Techical Report of the Institute of Television Engineers of Japan VR76–1; vol 42 No 5 pp 1–8; "Digital Audio Recording for ATT Format VTR", Ohtsu, et al published Jun. 1986.
The Journal of the Institute of Television Engineers of Japan vol 42 No.: 5 (1988) "D–2 Composite Digital VTR", Brush et al; published May 20, 1988.
German Publication "Encoding for Error Correction and Error Recognition" to Swoboda.

*Primary Examiner*—Thai Q. Tran
*Assistant Examiner*—Huy Nguyen

[57] ABSTRACT

A digital video tape recorder has interpolation and crossfading circuits and records audio and video signals in independent frames, the audio frames being offset with respect to the video frames. For a four-channel audio signal, the even and odd samples are recorded near different edges of the tape, enabling burst errors near one edge to be recovered efficiently by interpolating the audio signal from the other edge. When audio dubbing is performed, the first and last dubbed frames contain the even samples of the new signal and the odd samples of the old signal, or vice versa, and audio-dubbing flags are recorded in the these frames. When these frames are played back, the old and new signals are regenerated by interpolation and crossfaded to create a smooth transition between them. The same apparatus can also be used to record a two-channel signal, by recording each sample twice.

43 Claims, 20 Drawing Sheets

U.S. PATENT DOCUMENTS

| | | | |
|---|---|---|---|
| 4,685,004 | 8/1987 | Takahashi et al. | |
| 4,697,212 | 9/1987 | Osawa et al. | |
| 4,751,590 | 6/1988 | Wiekinson | 358/343 |
| 4,768,108 | 8/1988 | Higurashi | |
| 4,835,627 | 5/1989 | Endo et al. | 360/32 |
| 5,113,293 | 5/1992 | Endo et al. | 360/32 |
| 5,499,106 | 3/1996 | Arano et al. | 358/343 |

FIG.13
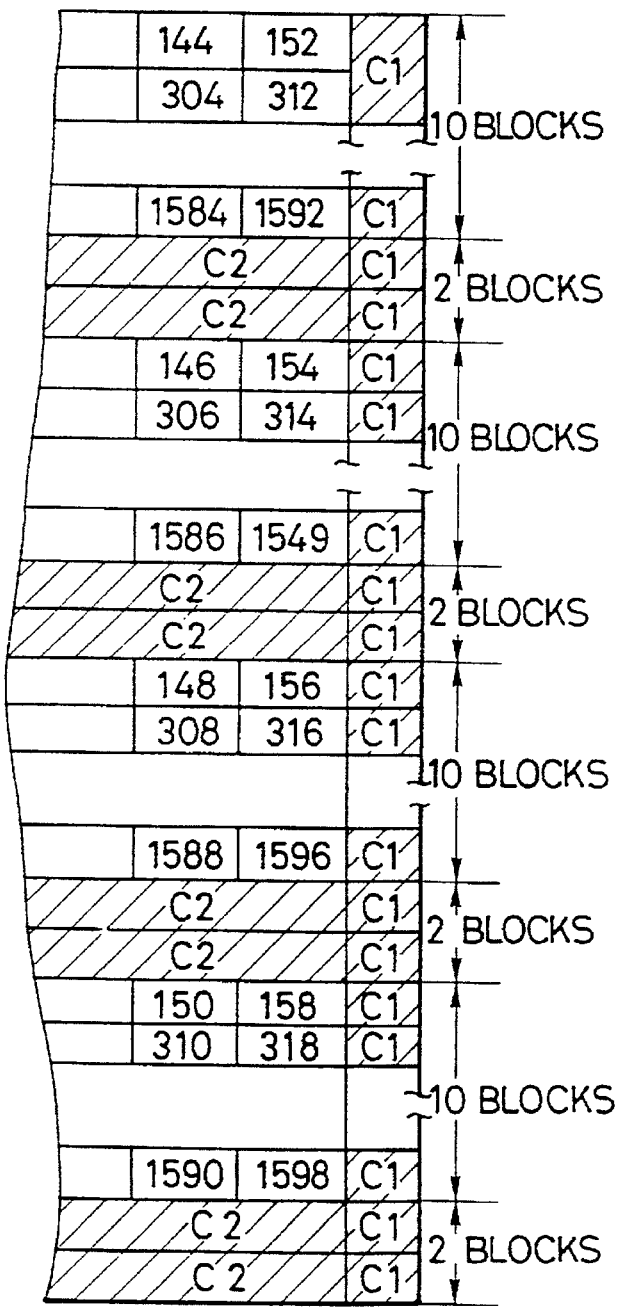

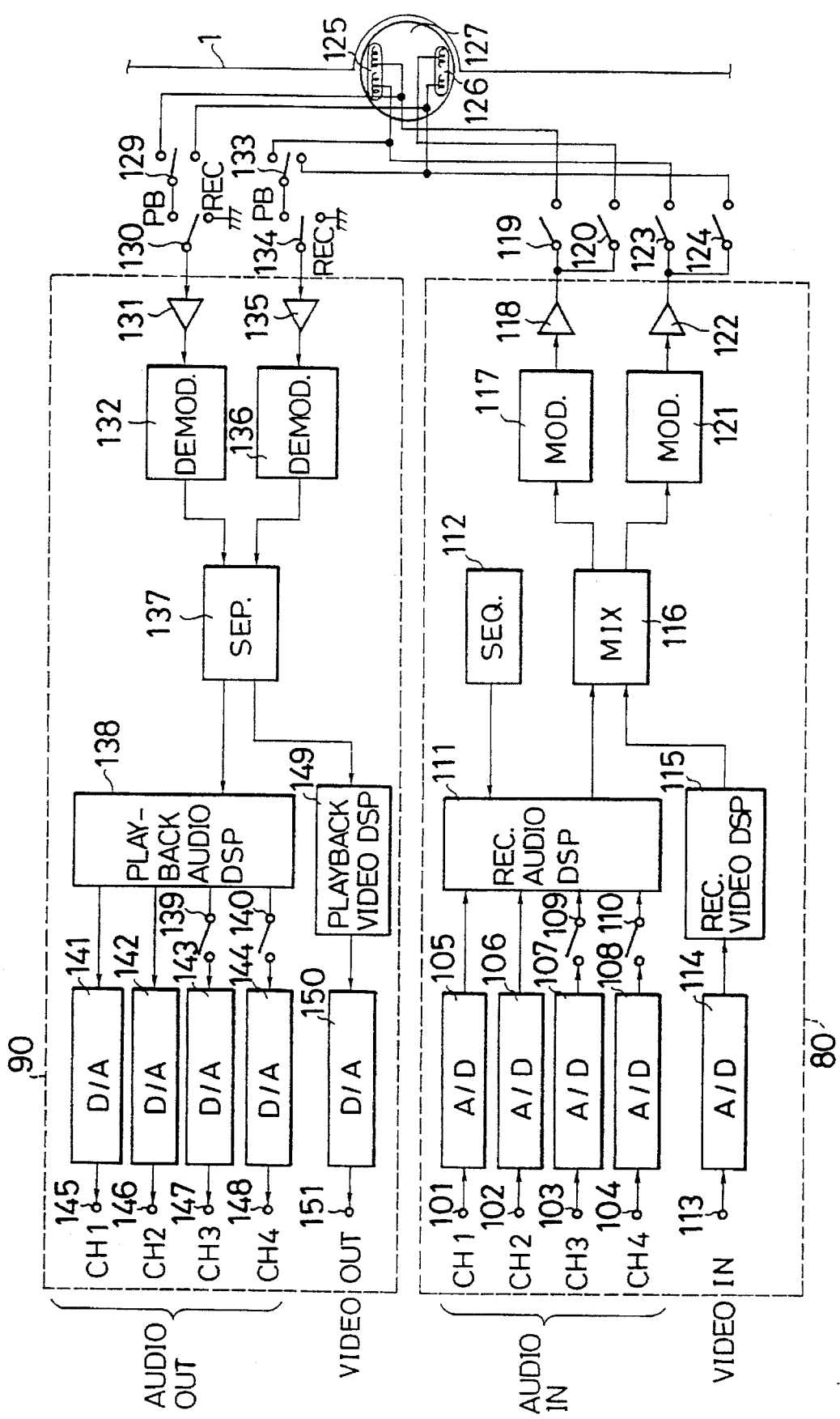

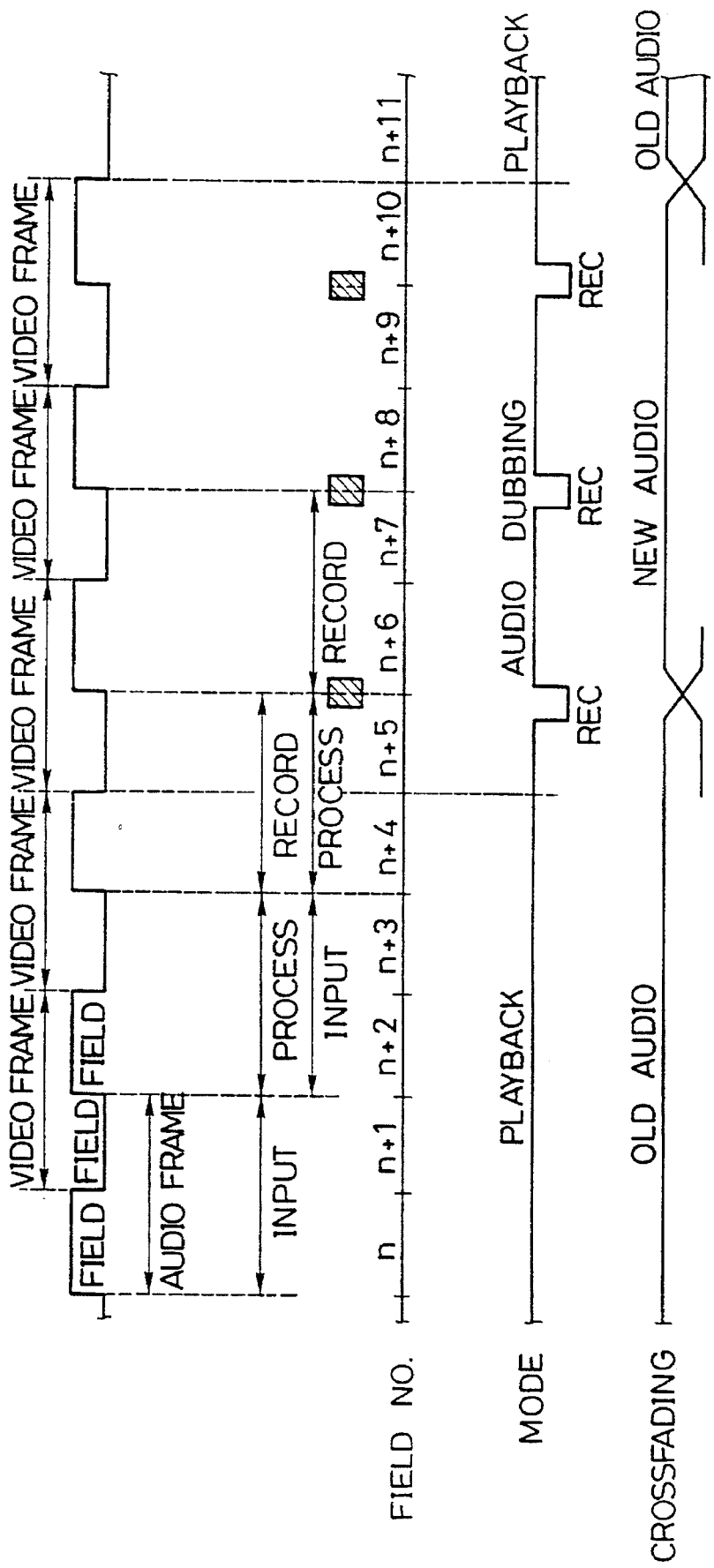

DIGITAL SIGNAL RECORDING METHOD AND DIGITAL VIDEO TAPE RECORDER

This application is a continuation of application Ser. No. 07/362,243, filed on Jun. 6, 1989 abandoned, the entire contents of which are hereby incorporated by reference.

BACKGROUND OF THE INVENTION

This invention relates to a method of recording digital audio and video signals on a magnetic tape, and to a digital video tape recorder for recording signals according to this method and playing back the recorded signals.

Video tape recorders, also known as video cassette recorders, are widely used both in the television broadcast industry and at the consumer level for recording and playing back video signals with associated audio signals. The audio and video signals are recorded on a magnetic tape in a series of helical tracks oriented at an angle to the long axis of the tape. Recently digital video tape recorders, which offer superior noise performance and editing capabilities, have come into use. In recording, a digital video tape recorder samples analog audio and video input signals, encodes the sample values digitally, and records the digital data on the tape. In playback, the digital video tape recorder reads digital data from the tape, decodes the data, and generates analog audio and video output signals.

The prior art of recording digital audio and video signals is embodied in, for example, the D-2 format developed by the Society of Motion Picture and Television Engineers, in which each helical track comprises a video sector and two short audio sectors, the audio sectors being disposed at the two ends of the track. The audio sectors are thus located near the edges of the tape, which are the areas most prone to burst errors caused by scratches. Various error countermeasures are taken. For example, an error-correcting code is recorded together with the audio and video data, permitting the correction of burst errors up to a certain length. Also, the audio signal, which normally comprises four channels, is recorded with 100% redundancy, identical data being written in the audio sectors at the upper and lower edges of the tape.

The video signal is divided into frames, a frame corresponding to one complete image on the screen. A frame is divided into two fields comprising the even and odd raster lines on the screen, respectively. In the D-2 format, a frame comprises twelve consecutive helical tracks on the tape, each of its constituent fields comprising six consecutive tracks.

The audio signal is recorded in a continuous manner without being divided into frames and fields in any special way on the tape. Most digital video tape recorders, however, internally divide the audio signal into frames at the same points as the video signal and process the audio signal one frame at a time.

When a tape is edited, the editing normally begins and ends at a boundary between video frames, which provides a clean break in the video image. This practice is generally followed even when the editing is audio dubbing, in which the video signal is left unchanged but the audio signal is replaced with a new audio signal. In the prior art, since the same frame boundaries are used for the audio and video signals, after audio dubbing each audio frame consists entirely of the old audio signal or entirely of the new audio signal.

One problem with the D-2 format is that it adopts an inefficient means of coping with burst errors: recording the audio signal with 100% redundancy uses excessive space on the tape. This problem becomes even more pronounced when the D-2 format is adapted to a two-channel audio signal. (Many digital video tape recorders are built to accept both two-channel and four-channel audio signals.) If the same recording parameters (such as sampling frequency and number of bits per sample) are used as for a four-channel signal, the D-2 format requires 200% redundancy for a two-channel signal.

A further problem is that, the question of redundancy aside, the disposition of the audio sectors in narrow strips near the edges of the tape increases their vulnerability to burst errors, while the relative shortness of the audio sectors limits the error-correcting capability of the error-correcting code.

A problem that occurs when audio dubbing is performed using the D-2 format is that, while a clean break may be desirable in the video signal, it causes noise in the audio signal. Irritating clicks are heard at the points of change from the old audio signal to the new audio signal and from the new audio signal to the old audio signal. (These points will be referred to herein as the edit points.) Complex schemes have been used to combat this edit-point noise, but without complete success.

SUMMARY OF THE INVENTION

One object of the present invention is accordingly to provide efficient protection against burst errors.

Another object is to enable two-channel and four-channel audio signals to be recorded efficiently according to the same parameters.

Yet another object is to enable an audio-dubbed tape to be played back without unwanted audio noise at the edit points.

A digital signal recording method for recording digital audio and video signals in helical tracks on a tape according to this invention comprises steps of recording the video signal in video sectors in the helical tracks, separating the even samples of the audio signal from the odd samples, recording the even samples in audio sectors disposed near one edge of the tape, and recording the odd samples in audio sectors disposed near the other edge of the tape.

If the audio signal has two channels, the steps of recording the even and odd samples of the audio signal are repeated so that each sample is recorded twice in different audio sectors disposed near opposite edges of the tape.

The audio and video signals are furthermore divided into independent frames, the boundaries of the audio frames being offset from the boundaries of the video frames, and the even and odd samples in an audio frame are recorded in different helical tracks, these being located in different video frames. When audio dubbing is performed, an audio-dubbing flag is recorded in at least the first and last dubbed audio frames.

A digital video tape recorder according to this invention comprises a recording audio digital signal processing circuit for separating the even and odd samples of the audio signal when they are recorded on the tape, a sequence circuit for adding an audio-dubbing flag and information indicating the number of channels in the recorded audio signal, and a playback audio digital signal processing circuit with a decoding circuit, an ID detection circuit, one or more interpolation circuits for interpolating even and odd samples on command from the ID detection and decoding circuits, and one or more crossfading circuits for crossfading the audio signal when the ID detection circuit detects an audio-dubbing flag.

BRIEF DESCRIPTION OF THE DRAWINGS

FIG. 13 shows the structure of an audio subsector in FIG. 12 containing even sample data.

FIG. 20 is a block diagram of a novel digital video tape recorder.

FIG. 22 is a timing chart illustrating the audio dubbing process.

DETAILED DESCRIPTION OF THE EMBODIMENTS

A novel method of recording digital audio and video signals on magnetic tape, and a video tape recorder employing this method, will be described with reference to the drawings. First, however, a more detailed description will be given of the prior-art method as embodied in the D-2 format.

Figure 1:
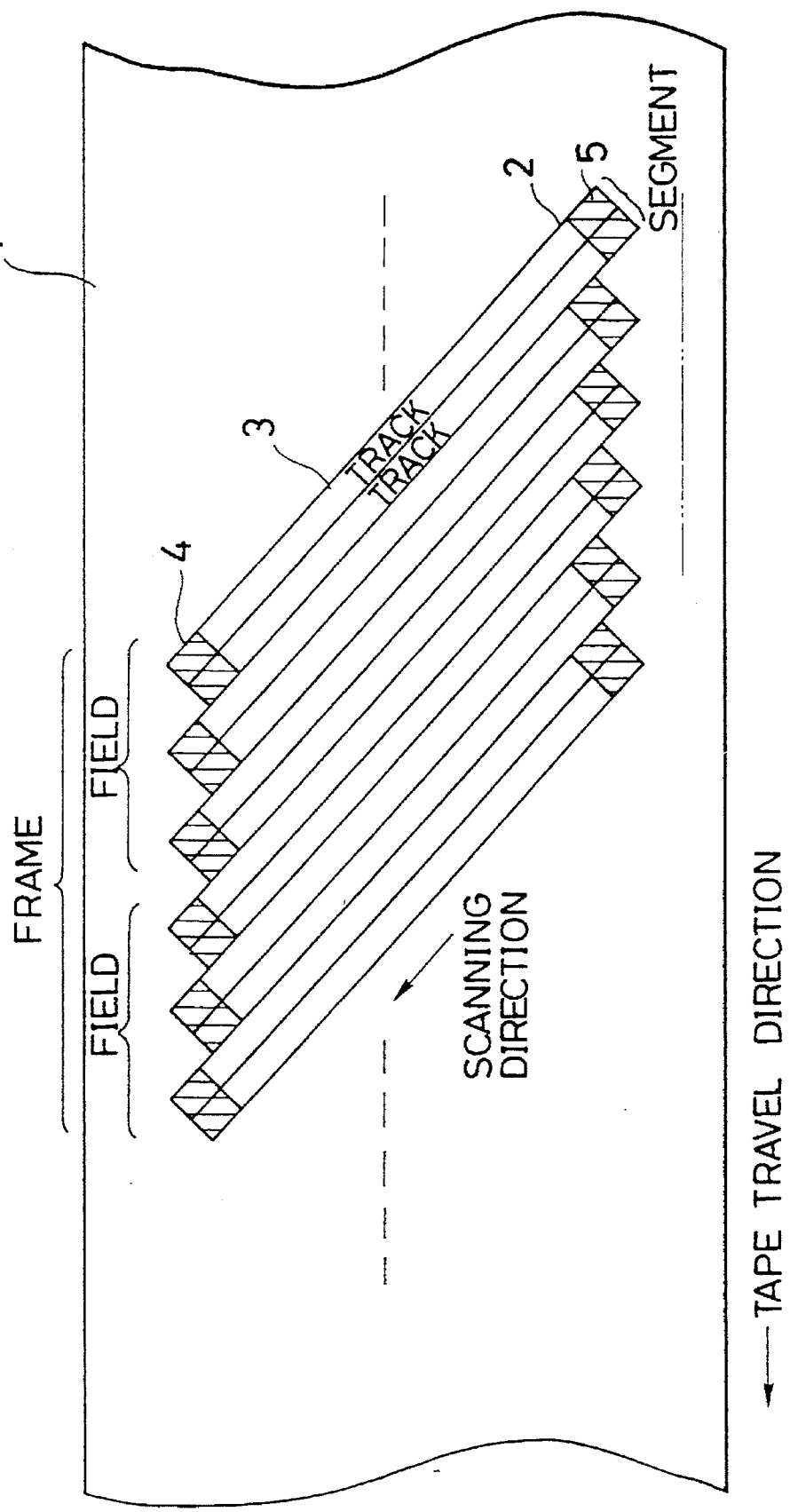
FIG. 1 shows a tape with helical tracks, illustrating a prior-art digital signal recording method.

FIG. 1 shows a tape 1 on which audio and video signals are recorded on helical tracks 2 according to the D-2 format. Each helical track 2 comprises a video sector 3, an upper tape edge audio sector 4, and a lower tape edge audio sector 5. The twelve tracks illustrated in the drawing make up one signal frame, the frame comprising two fields of six tracks each. The tracks are further grouped into segments, each comprising a pair of adjacent tracks. During recording or playback, the two tracks in a segment are scanned simultaneously as will be explained later.

FIG. 1 is schematic in nature and does not represent the actual appearance of the tape. For example, cue, control, and time code information is recorded in linear tracks disposed at the edges of the tape, which are not shown in the drawing. Also, for convenience of illustration the helical tracks 2 are shown inclined more steeply than they actually are. The actual helical track angle is approximately 6°.

Figure 2:
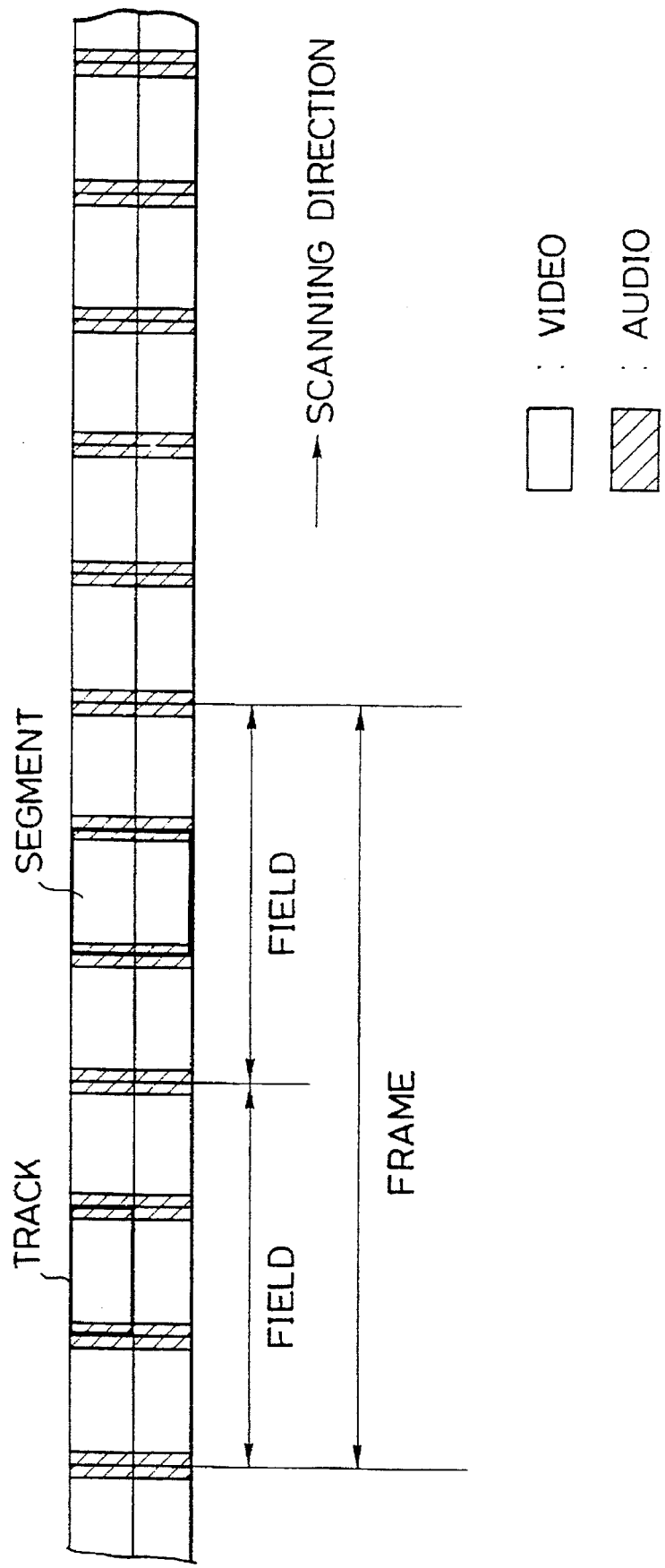
FIG. 2 shows the tracks in FIG. 1 rearranged to illustrate their scanning sequence.

FIG. 2 is a schematic drawing in which the tracks in FIG. 1 have been rearranged to show more clearly the sequence in which they are scanned. The upper and lower rows of tracks are scanned simultaneously. A segment comprises a pair of vertically adjacent tracks in FIG. 2, a field comprises three consecutive segments, and a frame comprises a pair of consecutive fields.

Figure 3:
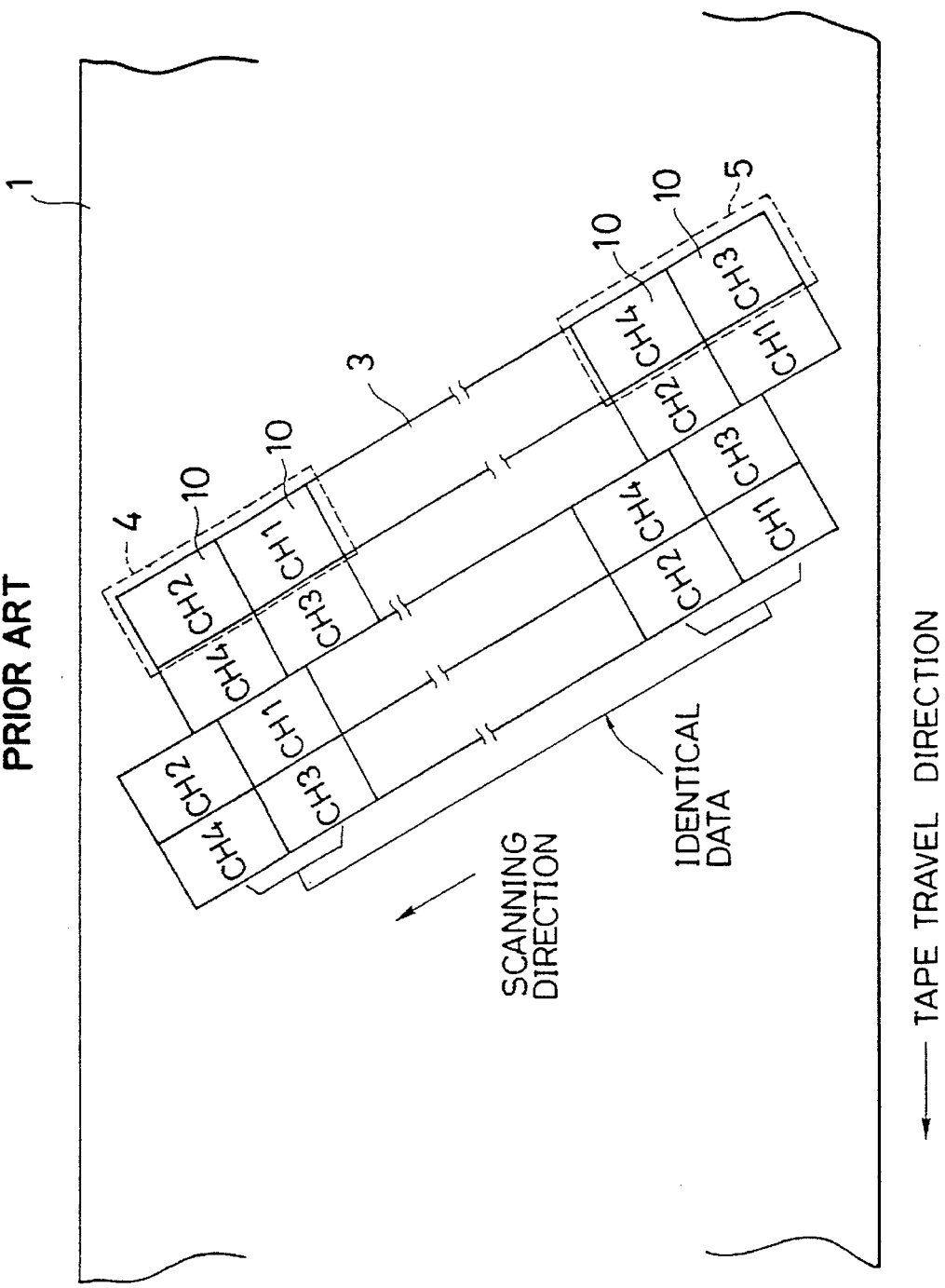
FIG. 3 shows the channel structure of the audio sectors in FIG. 1.

FIG. 3 shows the structure of the audio sectors 4 and 5 in further detail. Each audio sector 4 or 5 is divided into a pair of subsectors 10. When a four-channel signal is recorded, the data for each channel is recorded twice in each segment: once in a subsector of an upper tape edge audio sector 4, and once in a subsector of a lower tape edge audio sector 5.

Figure 4:
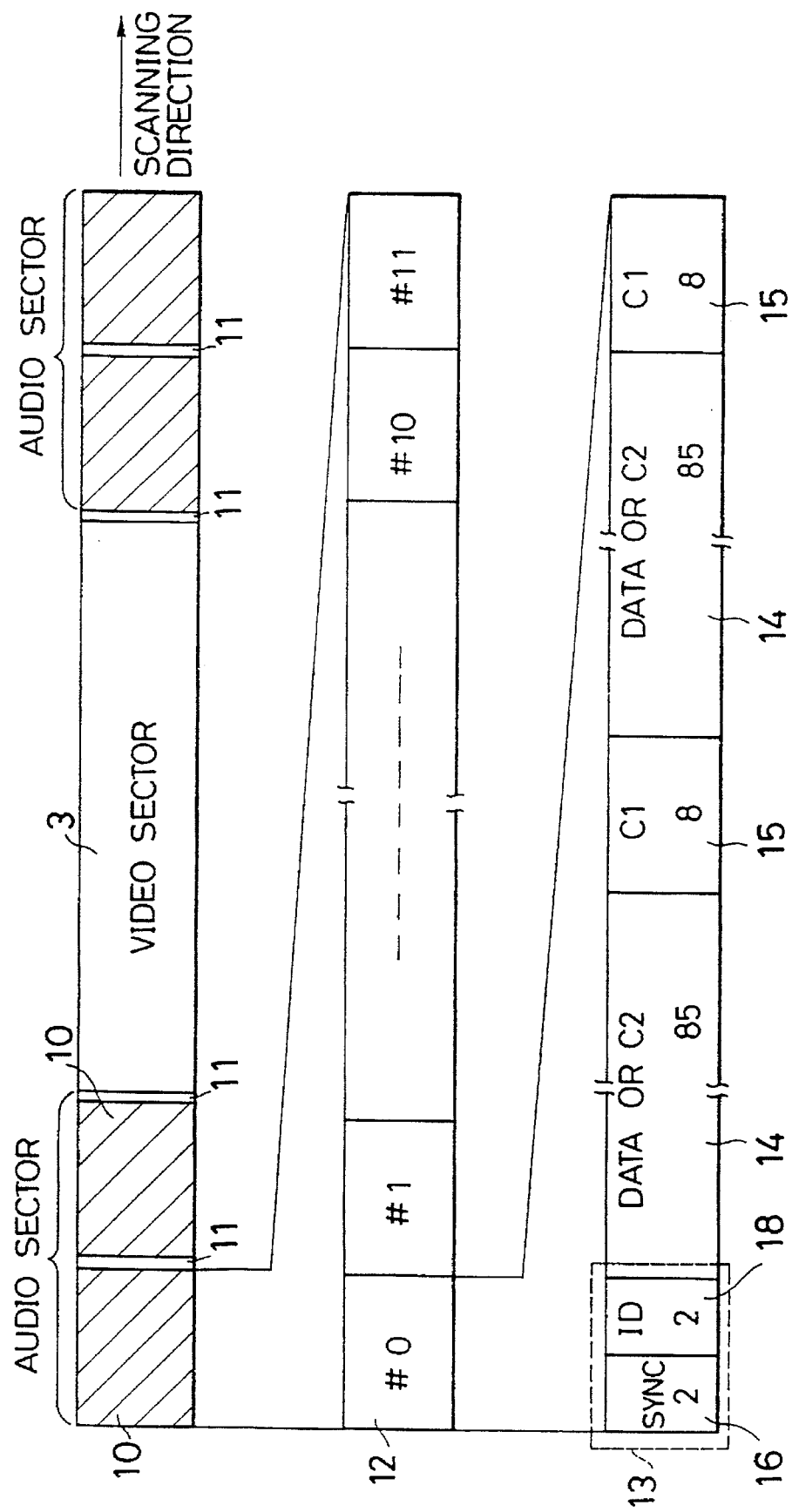
FIG. 4 shows the data structure of the audio sectors in FIG. 1.

FIG. 4 shows the structure of the audio sectors in still further detail. The subsectors 10 are delimited from each other and from the video sector 3 by gaps 11, which physically separate the subsectors and provide space for the recording of preamble and postamble information. Each subsector 10 comprises twelve data blocks 12, numbered #0 to #11. Each data block in turn comprises a header 13, a pair of data or C2 fields 14 in which either data or an outer error-correcting code is recorded, and a pair of C1 fields 15 in which an inner error-correcting code is recorded. The header 13 comprises a synchronization field 16 in which a synchronization pattern is recorded, and an ID field 18 in which user information such as a program index number can be recorded. The synchronization field 16 comprises two bytes, or "symbols," of data, the ID field 18 comprises two bytes, the data or C2 fields 14 comprise eighty-five bytes each, and the C1 fields 15 comprise eight bytes each.

At normal audio sampling rates of, for example, 800 samples per field with 16 to 20 bits per sample, the data capacity of the D-2 audio sectors greatly exceeds the actual amount of audio sample data. The excess space is used for recording data other than audio sample data, or is left unused.

Figure 5:
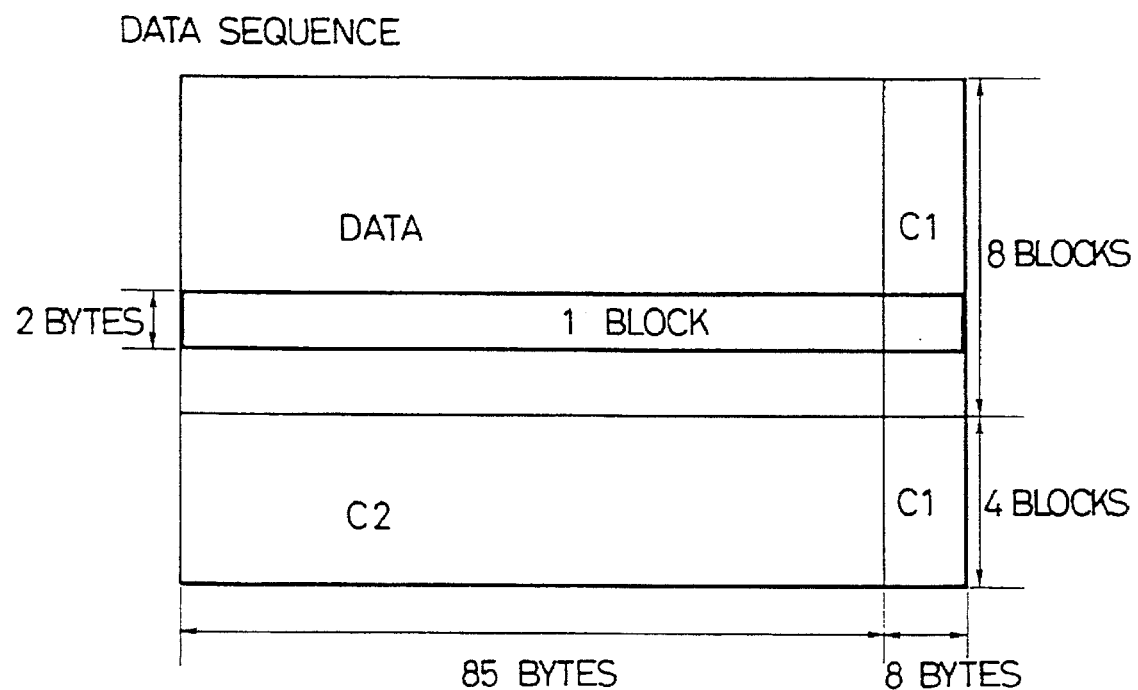
FIG. 5 shows the error-correcting code structure of the audio sectors in FIG. 1.

FIG. 5 is a schematic diagram illustrating the structure of an audio subsector 10 in a way that explicates the operation of the error-correcting code, omitting the headers 13. The data and C2 fields 14 contain audio data in eight of the twelve data blocks 12 and outer codes C2 in the remaining four blocks. The error-correcting code is of the Reed-Solomon type, in which the inner code C1 enables the correction of errors within blocks, and the outer code C2 enables the correction of errors extending across blocks. The assignment of an eight-byte inner code C1 to each eighty-five data bytes enables the correction of data errors in up to three of the eighty-five bytes. In the across-block direction, the assignment of four outer code bytes C2 to each eight audio data bytes, combined with erasure flags generated from the inner code C1, enables the correction of data errors in up to four of the eight data bytes.

FIG. 5 corresponds to the storage structure that would normally be employed in the memory of a digital video tape recorder, not the physical structure on the tape. On the tape, the data blocks 12 containing outer error-correcting codes C2 are interleaved among the data blocks 12 containing data.

Figure 6:
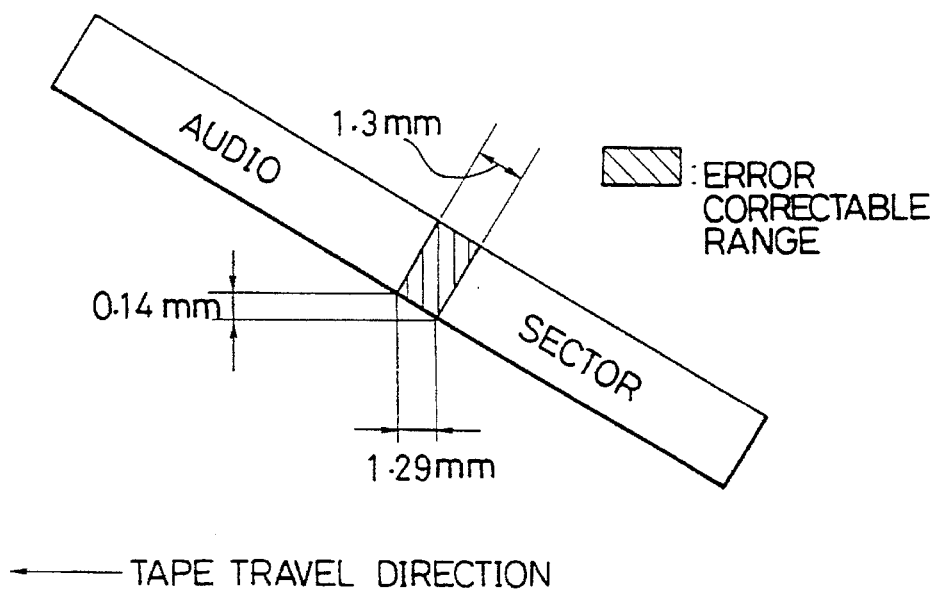
FIG. 6 illustrates the error-correcting capability of the error-correcting code structure in FIG. 5.

FIG. 6 shows the error-correcting capability of the D-2 format in terms of physical dimensions on the tape. Burst errors can be corrected if the range of the error does not exceed 1.3 mm in the direction parallel to the track, which corresponds to a scratch parallel to the tape axis with a maximum length of 1.29 mm or a maximum height of 0.14 mm.

Figure 7A:
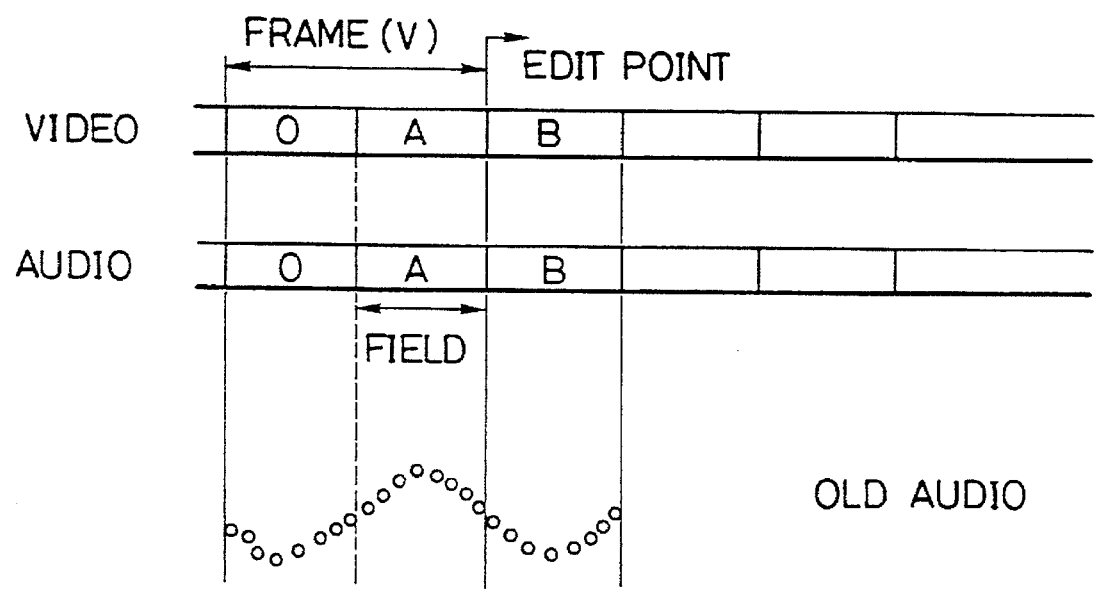
FIGS. 7A and 7B illustrate the effect of audio dubbing in the prior art.
Figure 7B:
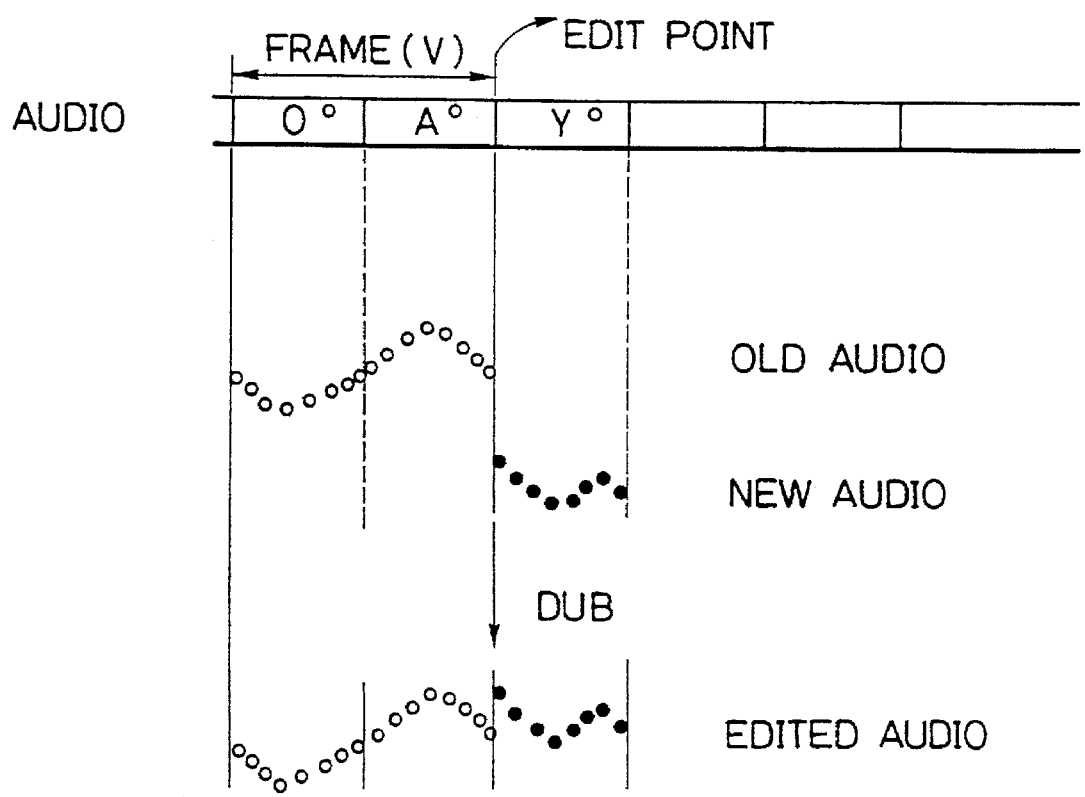

FIGS. 7A and 7B illustrate the effect of audio dubbing in the D-2 format. FIG. 7A illustrates a three-field portion of the old audio signal, wherein the first two fields (0 and A) belong to a frame V, this corresponding to a frame of the video signal, and the next field (B) is the first field in the next frame. Audio dubbing begins at the end of the frame V; that is, at the boundary between fields A and B. Thus a new signal, represented by black dots in FIG. 7B is recorded over the old signal starting in field B. The result, as shown in FIG. 7B, is a discontinuity in the audio signal that causes audible noise.

A novel method of recording audio and video signals on a magnetic tape will next be explained with reference to FIGS. 8 to 17. The novel method differs from the prior art in using fewer audio sectors, employing less redundancy, dividing the audio signal into frames that are offset from the video frames, and recording even and odd samples of the audio signal at different edges of the tape.

Figure 8:
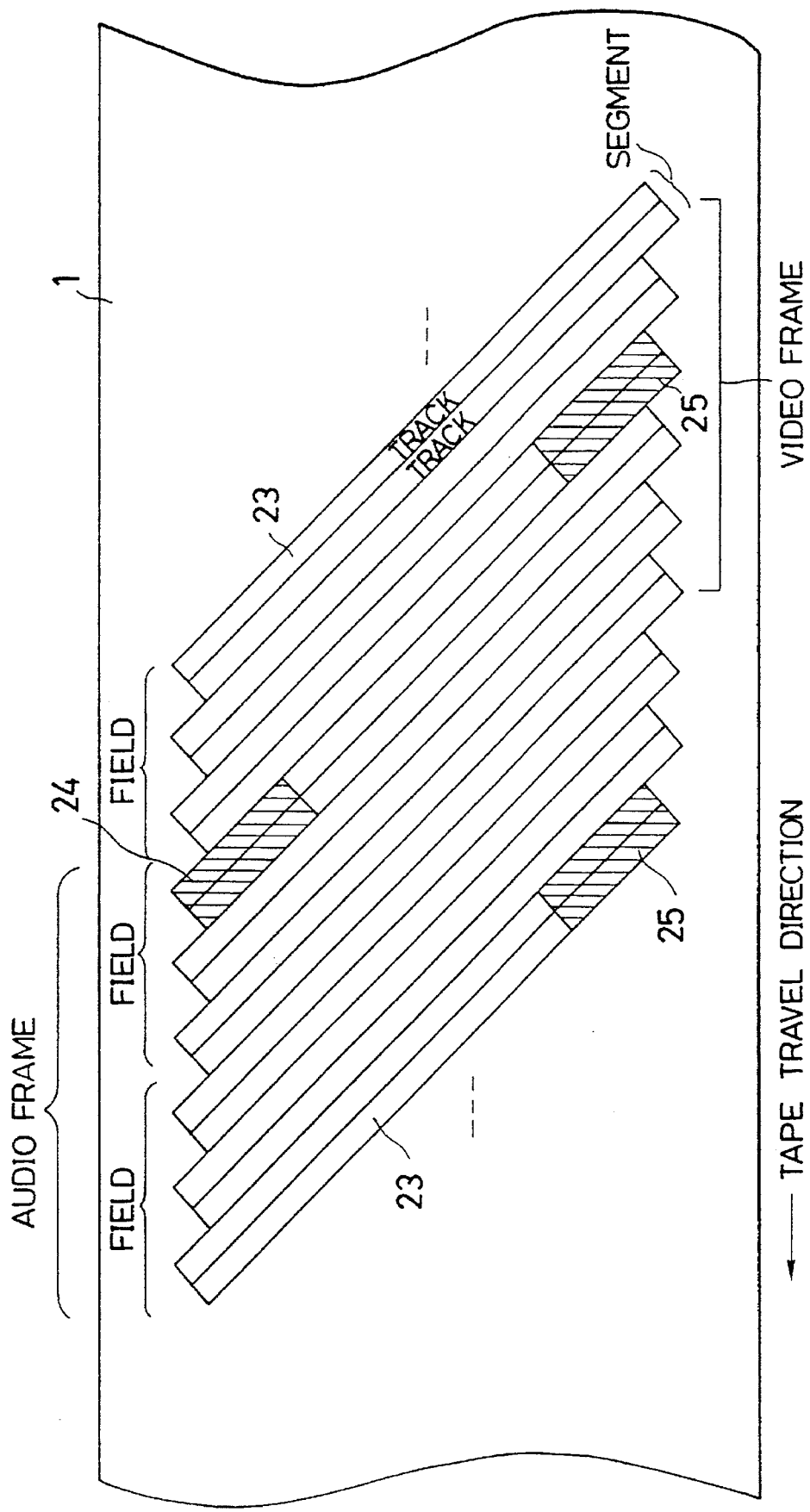
FIG. 8 shows a tape with helical tracks illustrating the novel digital signal recording method.

FIG. 8 shows a tape 1 on which audio and video signals are recorded in helical tracks 2 according to the novel method. The tracks are paired into segments and grouped into fields of three segments each as in the prior art, the segment and field groupings being common to the audio and video signals. The video signal is divided into frames comprising two fields each. The audio signal is also divided into frames comprising two fields each, but the boundaries between audio frames are offset by one field from the boundaries between video frames. Thus a pair of fields disposed in the same audio frame are disposed in different video frames, and vice versa.

The video signals are recorded in video sectors 23. The audio signals are recorded in upper tape edge audio sectors 24 and lower tape edge audio sectors 25. In the novel method, audio sectors 24 and 25 are recorded in a subset of the tracks in a frame, not in every track. In FIG. 8, for example, upper tape edge audio sectors 24 are recorded in only one of the six segments in a frame, and lower tape edge sector audio sectors 25 are recorded in another one of the six segments. The upper tape edge audio sectors 24 are disposed in different fields from the lower tape edge audio sectors 25.

As in the prior art, there may also be linear cue, control, and time code tracks disposed at the edges of the tape, not shown in the drawing, and the actual helical track angle is substantially 6°.

Figure 9:
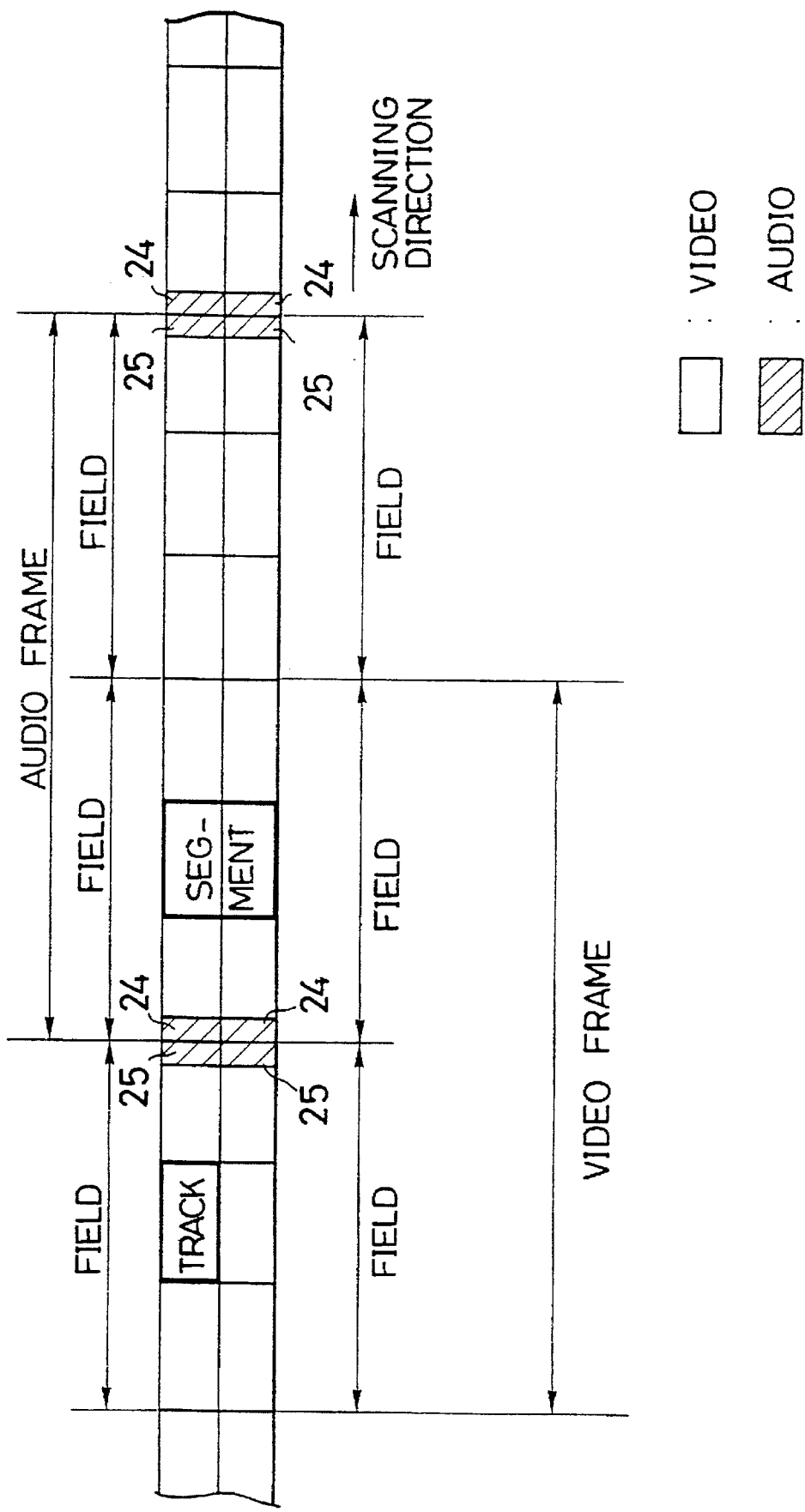
FIG. 9 shows the tracks in FIG. 8 rearranged to illustrate their scanning sequence.

FIG. 9 is a schematic diagram in which the tracks have been rearranged to show more clearly the order in which they are scanned. The upper and lower rows of tracks in FIG. 9 are scanned simultaneously. The audio signal in an audio frame is recorded in a pair of upper tape edge audio sectors 24 disposed at one end of the audio frame, and a pair of lower tape edge audio sectors 25 disposed at the other end. This disposition is preferable because it enables a group of four audio sectors disposed at the middle of a video frame to be scanned contiguously.

Figure 10:
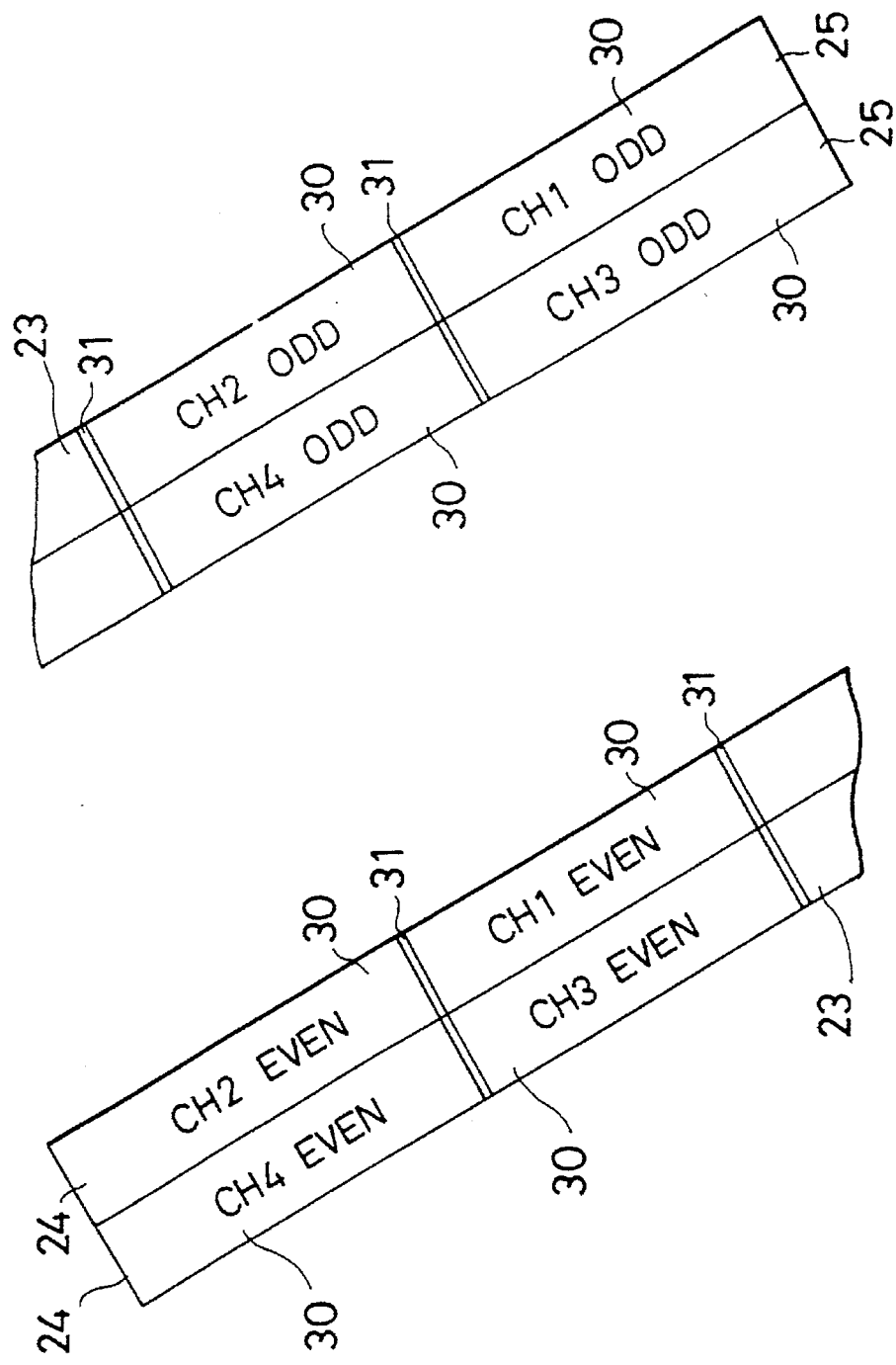
FIG. 10 shows the channel structure of the audio sectors in FIG. 8 for the four-channel case.

FIG. 10 shows how a four-channel audio signal is recorded in the two upper tape edge audio sectors 24 and the two lower tape edge audio sectors 25 in one audio frame. Each audio sector 24 or 25 comprises a pair of audio subsectors 30, which are separated from each other and from the video sectors 23 by gaps 31 similar to the gaps 11 employed in the prior art. Each audio subsector 30 contains audio data representing either even-numbered samples or odd-numbered samples of the audio signal in one channel. The four audio channels are assigned to audio subsectors 30 as shown, the even samples of each channel being recorded in the upper tape edge audio sectors 24 and the odd samples in the lower tape edge audio sectors 25. The even and odd samples are thus recorded in different fields in the audio frame.

Since a four-channel audio signal is recorded without redundancy, it uses tape space more efficiently than in the prior art. Protection against burst errors is provided by recording the even and odd signals at different edges of the tape, so that if a burst error destroys the data at one edge of the tape, a digital video tape recorder can still recover the data at the other edge and restore the original audio signal by interpolation, with little or no perceptible degradation of sound quality. The protection afforded by separating the even and odd signal is thus substantially equivalent to the protection provided by 100% redundancy in the prior art.

For protection against burst errors occurring simultaneously at both edges of the tape, in the upper tape edge audio sectors 24 channels 2 and 4 are recorded in the outermost audio subsectors 30, these being the ones most vulnerable to burst errors, while in the lower tape edge sectors 25 channels 1 and 3 are recorded in the outermost audio subsectors 30. This reduces the probability that the signal for a given channel will be lost completely.

Figure 11:
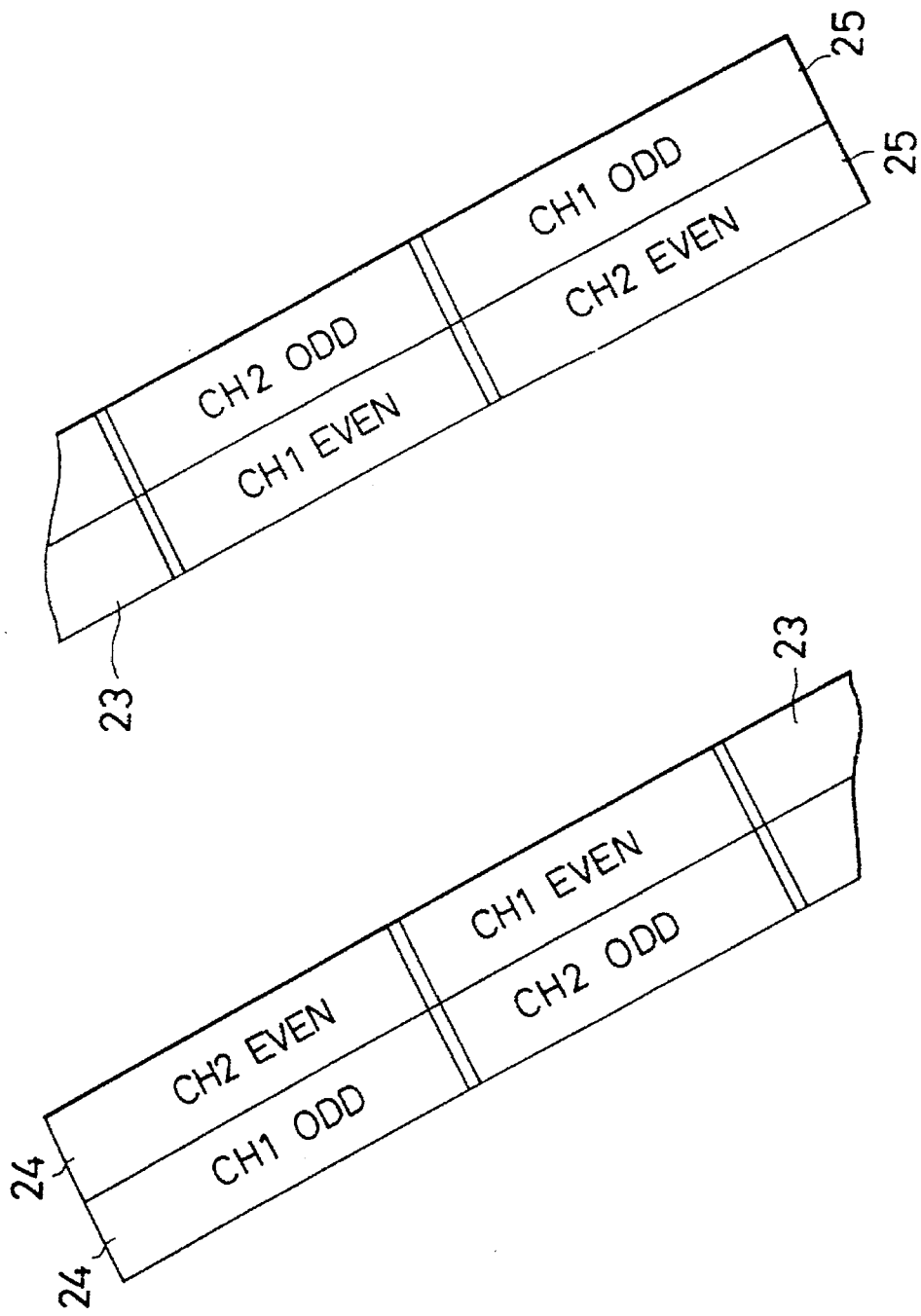
FIG. 11 shows the channel structure of the audio sectors in FIG. 8 for the two-channel case.

FIG. 11 shows how a two-channel audio signal is recorded according to the novel method. The signal for each channel is recorded twice: once with the even samples in an upper tape edge audio sector 24 and the odd samples in a lower tape edge audio sector 25; and once with the even samples in a lower tape edge audio sector 25 and the odd samples in an upper tape edge audio sector 24. The entire signal can thus be recovered from either edge of the tape. A two-channel signal therefore enjoys even better protection against burst errors than a four-channel signal.

Next two examples of data structures that can be employed in the audio subsectors 30 of the novel method will be described with reference to FIGS. 12 to 16.

Figure 12:
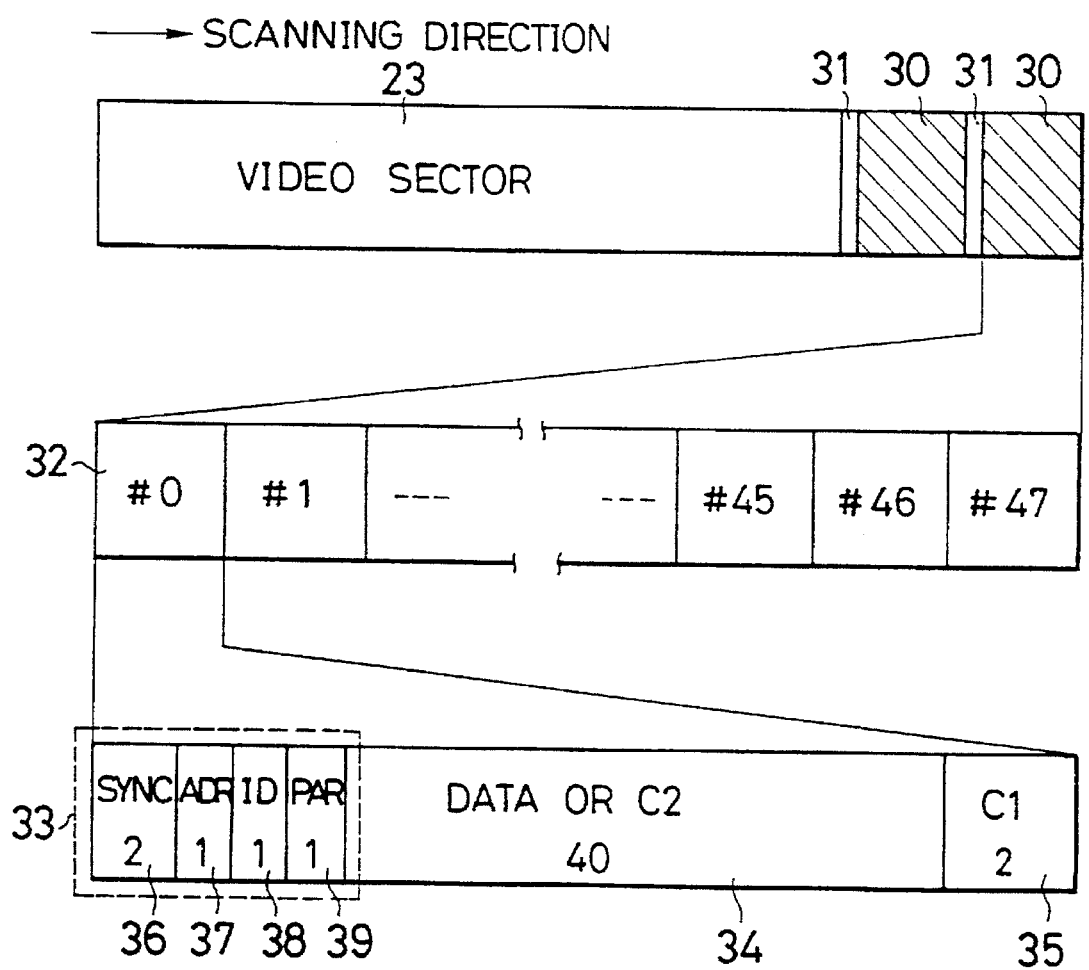
FIG. 12 shows a first example of the data structure of the audio sectors in FIG. 8.

In the first example, shown in FIG. 12, an audio subsector 30 comprises forty-eight data blocks 32, numbered #0 to #47. Each data block in turn comprises a header 33, a data or C2 field 34 in which either data or an outer error-correcting code is recorded, and a C1 field 35 in which a two-byte inner error-correcting code is recorded. The header 33 comprises a synchronization field 36, an address field 37, an ID field 38, and a parity field 39. The synchronization field 36 comprises a two-byte synchronization pattern. The address field 37 comprises a one-byte block address specifying, for example, the block sequence number. The one-byte ID field comprises user information such as a program number, and flags indicating whether the audio signal has two or four channels and whether it has been recorded normally or by audio dubbing. The parity field 39 comprises a one-byte error-correcting code for the header. The data or C2 field 34 comprises forty bytes and is thus capable of storing, for example, twenty 16-bit digitized signal samples.

FIG. 13 shows the audio subsector structure in more detail for the case in which the sampling rate is eight hundred 16-bit samples per field, or 1600 samples per audio frame, the samples being numbered from 0 to 1599. The audio subsector in FIG. 13 contains even sample data. The headers 33 are not shown. The structure is interleaved in the following manner. Data blocks #0, #2 . . . #18 contain audio signal samples 0, 8, ... ; data blocks #24, #26, ... , #42 contain samples 2, 10 ... ; data blocks #1, #3 ... , #19 contain samples 4, 12 ... ; data blocks #25, #27 ... , #43 contain samples 6, 14 . . . . Data blocks #20 to #23 and #44 to #47 contain outer (C2) error correcting codes.

Figure 14:
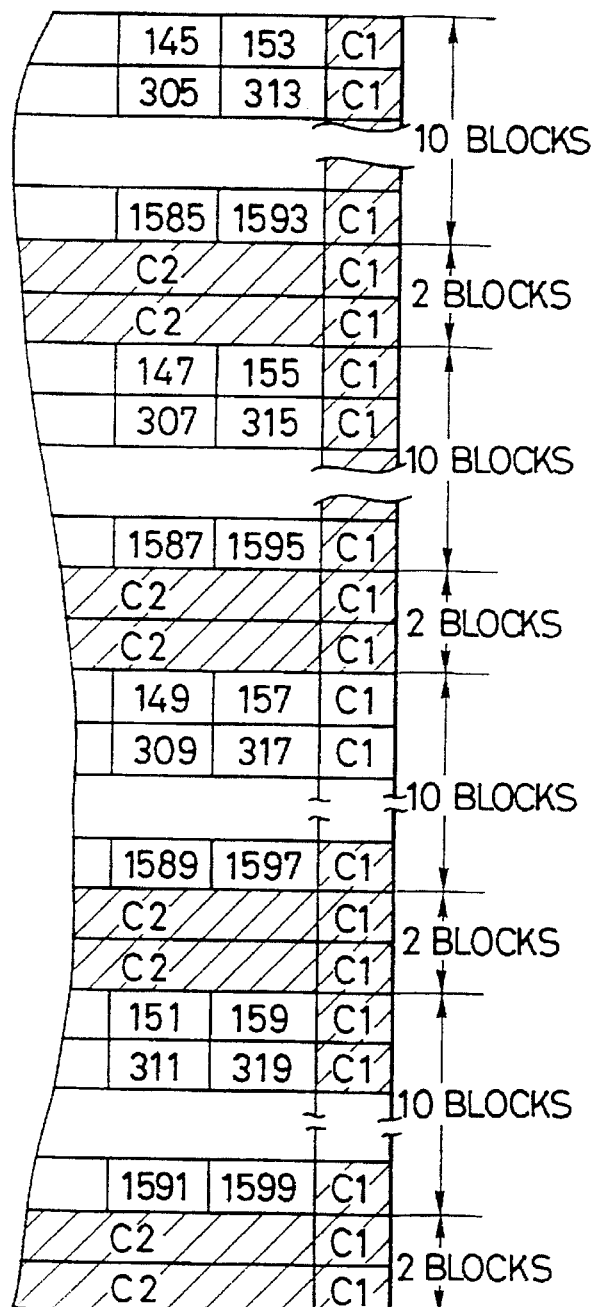
FIG. 14 shows the structure of an audio subsector in FIG. 12 containing odd sample data.

FIG. 14 shows the structure of an audio subsector in which odd samples are recorded. The data is interleaved in the same way as in FIG. 13, only the sample numbers being different.

The effect of time interleaving in FIGS. 13 and 14 is to distribute the damage caused by a burst error over different parts of the audio signal so that even if the error cannot be corrected by the error-correcting codes, the resulting degradation of time audio sound will be less perceptible than if the error were concentrated at one place. This interleaving and the separation of odd and even samples at different edges of the tape provides adequate protection against burst errors with less error-correcting code information than the prior art and no redundancy, thus enabling the audio signal to be recorded much more efficiently than in the prior art.

Figure 15:
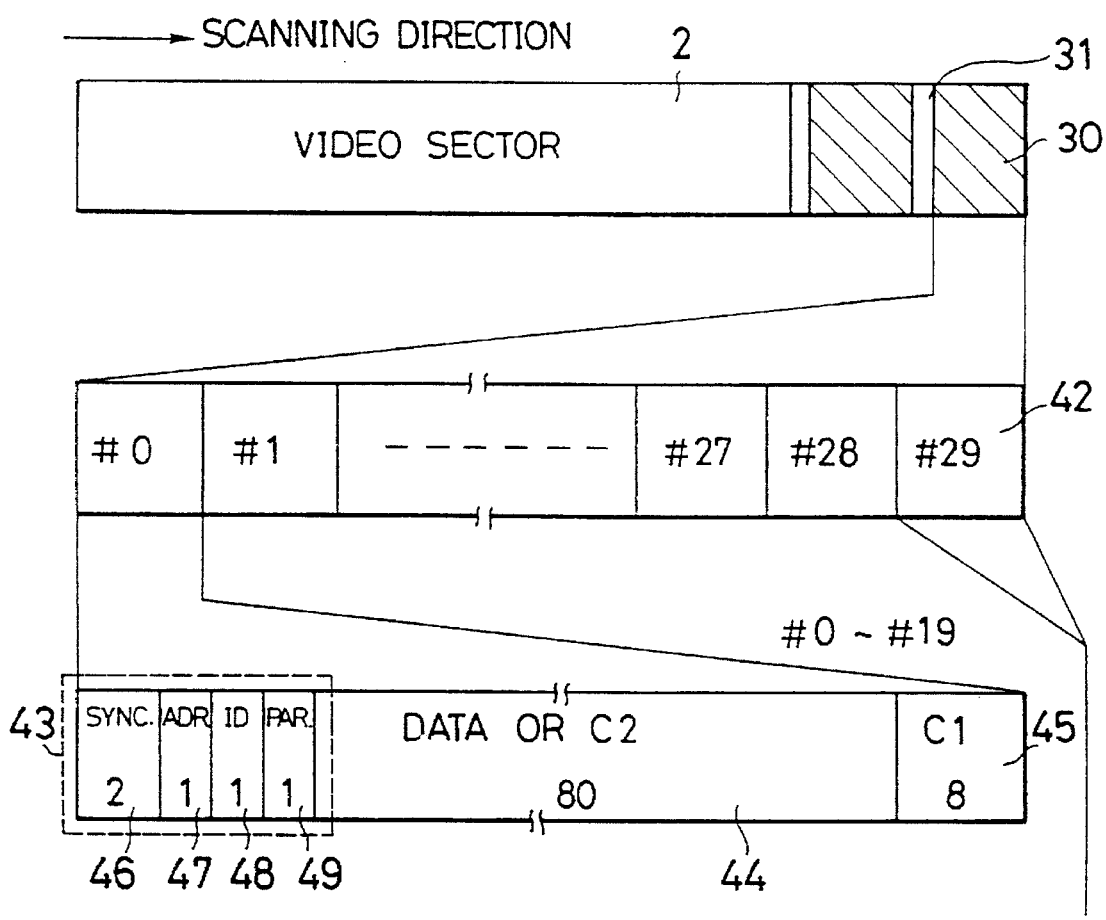
FIG. 15 shows a second example of the data structure of the audio sectors in FIG. 8.

The second example, shown in FIG. 15, also enables the audio signal to be recorded more efficiently than in the prior art, and provides even greater protection against burst errors. In this example a subsector 30 comprises thirty data blocks 42 numbered #0 to #29. Each data block 42 comprises a five-byte header 43, an eighty-byte data or C2 field 44, and an eight-byte C1 field. The header 43 is similar in structure to the header 33 in FIG. 12, comprising a synchronization field 46, an address field 47, an ID field 48, and a parity field 49.

Figure 16:
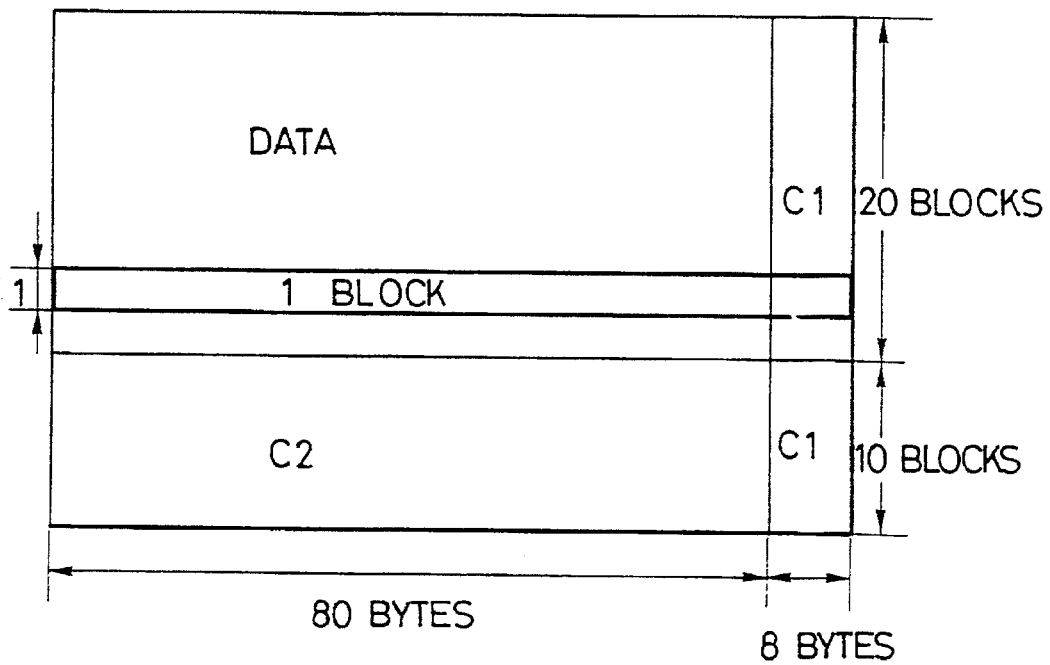
FIG. 16 shows the error-correcting code structure of the second example in greater detail.

FIG. 16 shows the audio subsector structure in FIG. 15 in a different form, omitting the headers 43. Audio sample data is stored in twenty of the data blocks, and outer (C2) error-correcting codes in ten of the data blocks. The data blocks and data samples can be interleaved in a way similar to that shown in FIGS. 13 and 14. The C1 error-correcting codes enable the correction of in-block errors up to three bytes in length. The C2 error-correcting codes, providing ten bytes or error-correcting information for each twenty bytes of data, enable the correction of up to four-byte errors in the across-block direction.

Figure 17:
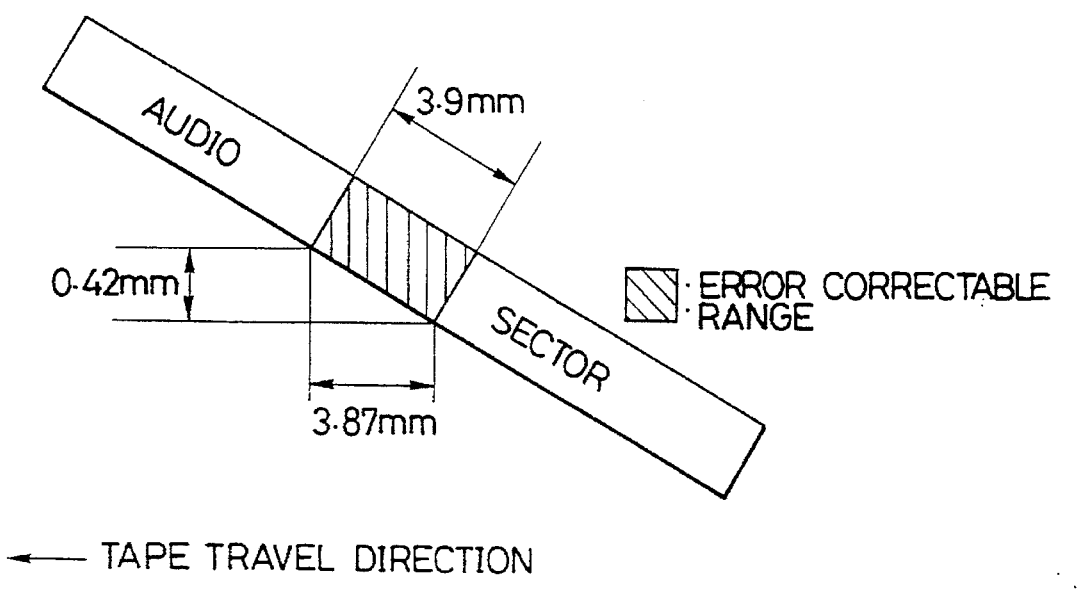
FIG. 17 illustrates the error-correcting capability of the error-correcting code structure in FIG. 16.

FIG. 17 shows this error-correcting capability in terms of physical dimensions on the tape. The error-correcting codes in FIGS. 15 and 16 can correct burst errors extending up to 3.9 mm in the direction parallel to the track, corresponding to a scratch parallel to the tape axis with a maximum length of 3.87 mm or a maximum height of 0.42 mm. This improvement by a factor of 3.0 over the prior art results from the use of longer audio subsectors.

From the foregoing description it will be apparent that the novel recording method enables both two-channel and four-channel audio signals to be recorded with the same parameters, requiring only substantially half as much space as in the prior art, or less. Efficient error protection strategies such as separating the even and odd samples, however, enable the novel method to provide adequate protection against burst errors, the degree of protection in the second example shown FIGS. 15 to 17 exceeding that in the prior art.

Figure 18A:
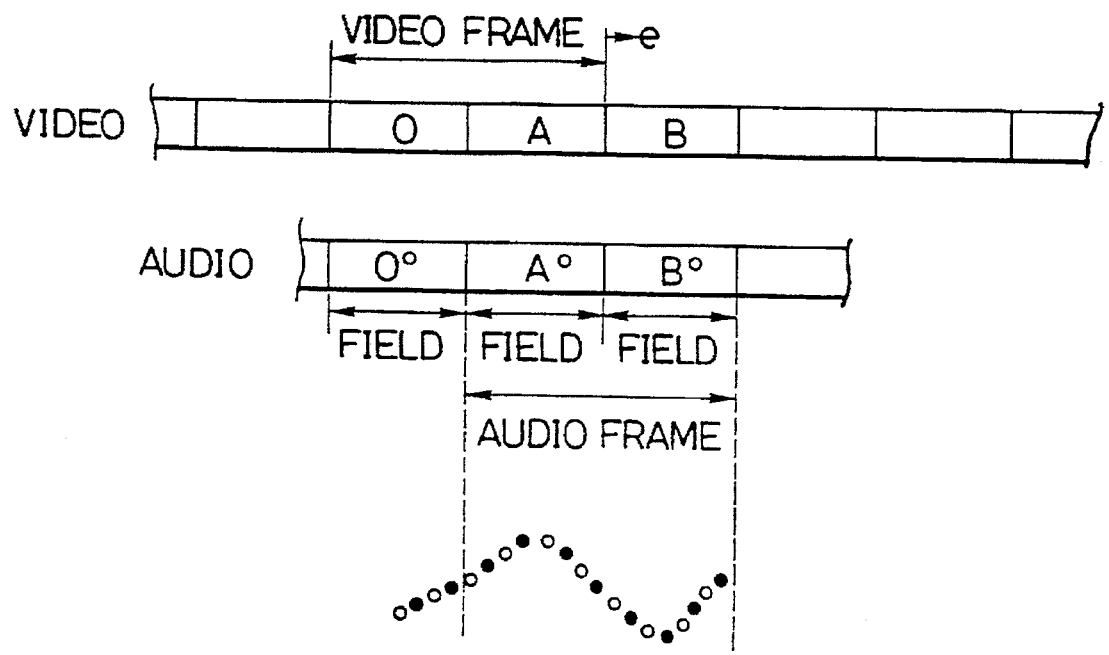
FIG. 18A and FIG. 18B illustrate the effect of audio dubbing in the novel method for the four-channel case.
Figure 18B:
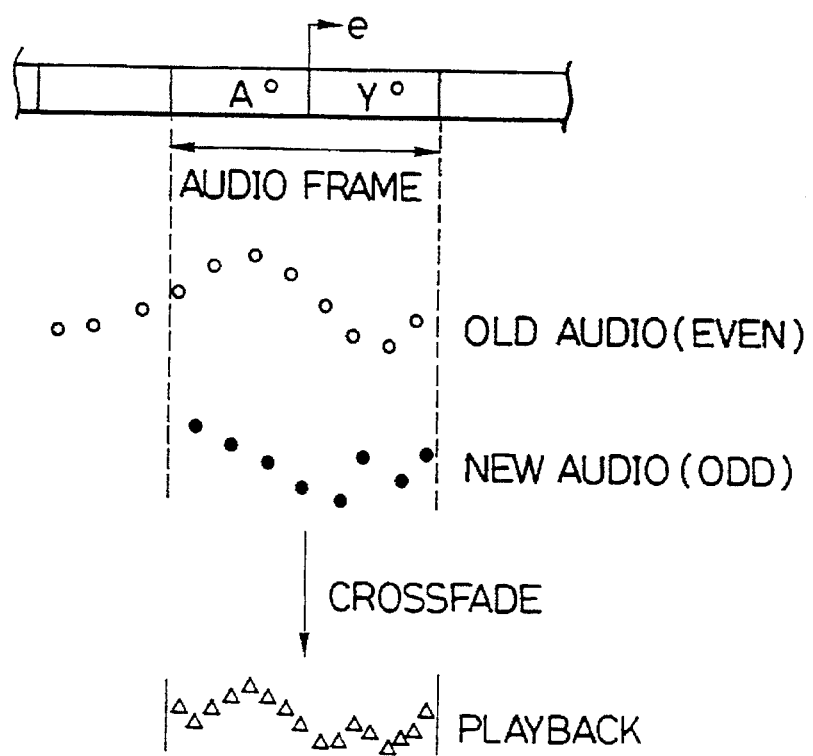

In addition to protecting against burst errors, the novel method also enables noise introduced at the edit points by audio dubbing to be prevented. This is done by recording an audio-dubbing flag in the ID field 38 or 48 to indicate where audio dubbing is performed, so that a digital video tape recorder equipped with a crossfading circuit can crossfade the old and new audio signals at the edit points. FIGS. 18A and 18B illustrate this process for a four-channel audio signal.

FIG. 18A shows three fields of the old audio signal, fields 0 and A belonging to one video frame and field B to the next video frame. Since the audio and video frames are staggered, fields A and B are in the same audio frame. Hence the even samples of the signal in this audio frame, represented by white circles, are recorded in field A and the odd samples, represented by black circles, in field B.

Audio dubbing begins as usual at the end of a video frame, in this case at the end of field A, this point being marked as the edit point e. The audio signal in field B is replaced with a new audio signal labeled Y in FIG. 18B. The data in the audio frame at the edit point e therefore comprises the even samples of the old audio signal recorded in field A, and the odd samples of the new audio signal recorded in the field now labeled Y. In addition an audio-dubbing flag is recorded as ID information in one or more data blocks in field Y.

When the edited tape is played back, the digital video tape recorder can detect the audio-dubbing flag in the audio frame comprising fields A and Y, regenerate the old audio signal by interpolation from the even samples in field A, regenerate the new audio signal by interpolation from the odd samples in field Y, and crossfade the old and new audio signals during the playback process. The result will be the audio output signal shown at the bottom of FIG. 18B, in which a smooth, noise-free transition occurs from the old audio signal to the new audio signal.

Figure 19A:
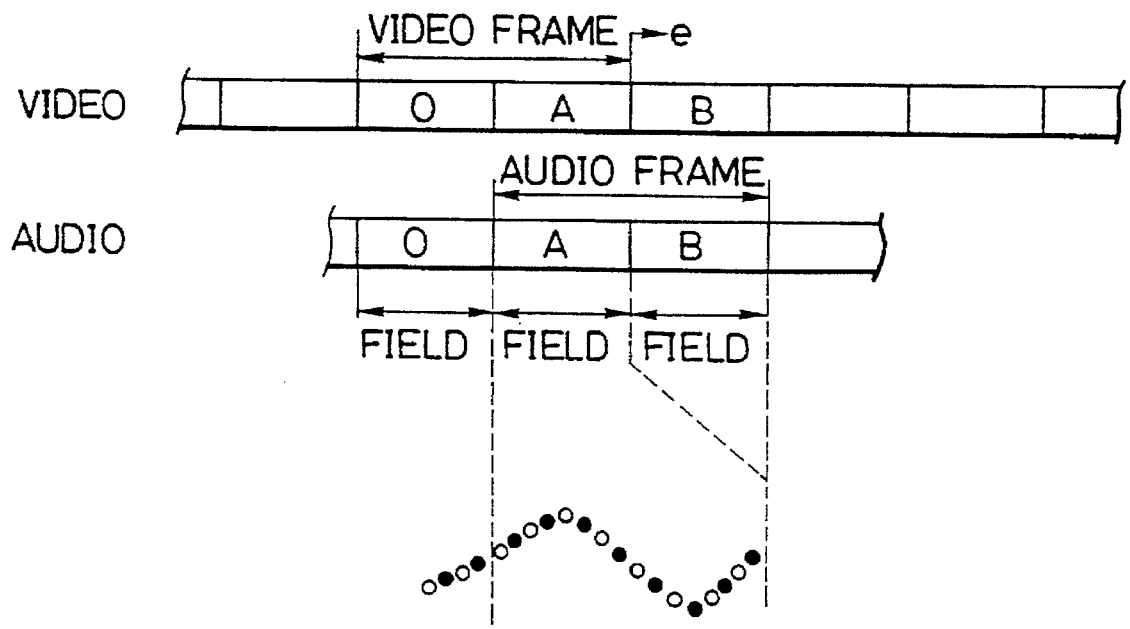
FIG. 19A and FIG. 19B illustrate the effect of audio dubbing in the novel method for the two-channel case.
Figure 19B:
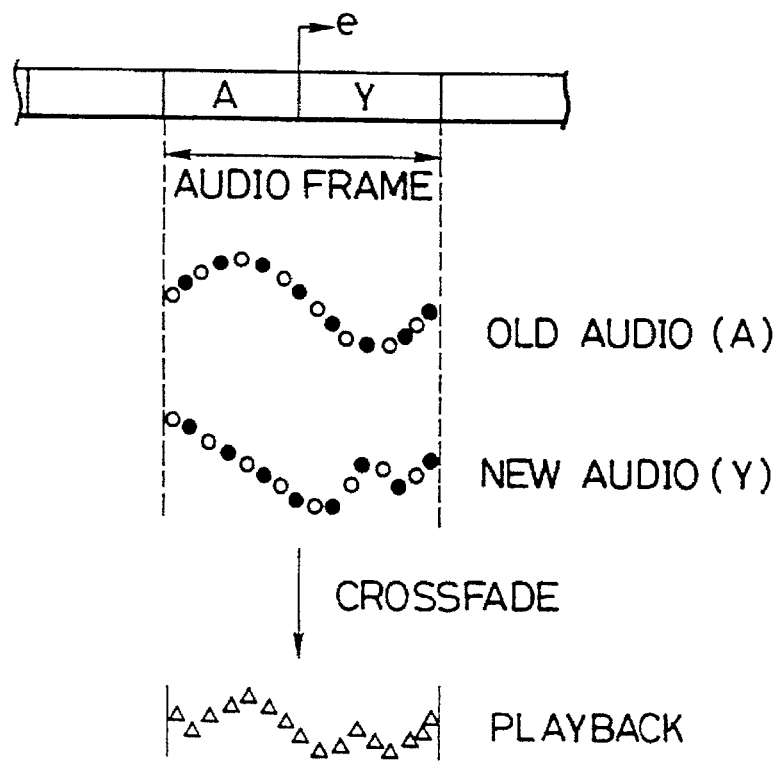

FIGS. 19A and 19B illustrate the same process for a two-channel audio signal. In this case, the same audio information is recorded in fields A and B in FIG. 19A. After audio dubbing, the digital video tape recorder can obtain the entire old audio signal from field A, and the entire new audio signal from field Y; it can therefore crossfade these signals without the need for interpolation.

A similar procedure is followed at the edit point at the end of audio dubbing. An audio-dubbing flag is recorded as ID information in the last audio field to be dubbed. During playback, the audio signal from this field is crossfaded with the audio signal from the next field, which belongs to the same audio frame, to create a smooth transition from the new to the old signal.

Next a novel video tape recorder for recording digital audio and video signals on a magnetic tape by the novel method and playing them back will be described with reference to FIGS. 20 to 22. The novel video tape recorder employs well-known circuits such as modulating, mixing, demodulating, separation, decoding, interpolation, and crossfading circuits, detailed descriptions of the internal structure of which will be omitted.

FIG. 20 is a block diagram illustrating the overall structure of the novel digital video tape recorder. The recording section 80 has four audio input terminals: a channel-1 audio signal input terminal 101, a channel-2 audio signal input terminal 102, a channel-3 audio signal input terminal 103, and a channel-4 audio signal input terminal 104. The audio signals input at these terminals are applied respectively to a first analog-to-digital (hereinafter written A/D) converter 105 for converting the channel-1 audio signal to a digital signal, a similar second A/D converter 106, a similar third A/D converter 107, and a similar fourth A/D converter 108. The outputs of the third and fourth A/D converters 107 and 108 are sent through a first number-of-recording-channels switch 109 and a second number-of-recording-channels switch 110, respectively, to a recording audio digital signal processing circuit 111, while the outputs of the first and second A/D converters 105 and 106 are sent directly to the recording audio digital signal processing circuit 111. The recording audio digital signal processing circuit 111 also receives ID information from a sequence circuit 112.

The recording section also comprises a video signal input terminal 113 connected to a fifth A/D converter 114, the output of which is sent to a recording video digital signal processing circuit 115. A mixing circuit 116 receives the output of the recording audio digital signal processing circuit 111 and the recording video digital signal processing circuit 115 and combines them by time-division multiplexing. The output of the mixing circuit 116 is routed over two paths: one leading to a first modulating circuit 117 for modulating the multiplexed signal, then to a first amplifier 118 for amplifying the modulated signal, then to first and second switches 119 and 120 for switching between the recording and playback states; the other leading similarly to a second modulating circuit 121, a second amplifier 122, and third and fourth switches 123 and 124.

The first through fourth switches 119, 120, 123, and 124 connect the recording section of the digital video tape recorder to first and second dual rotary heads 125 and 126, which are installed in a drum 127. Each dual rotary head 125 or 126 is capable of simultaneously scanning two helical tracks in a segment on a tape 1. The first dual rotary head 125 is connected to the first switch 119 and the third switch 123. The second dual rotary head 126 is connected to the second switch 120 and the fourth switch 124. The tape 1 wraps partly around the drum 127; in FIG. 20 the tape wrap angle is 180°.

The playback section 90 of this digital video tape recorder comprises a first head switch 129 for selecting one of the dual rotary heads 125 and 126, a fifth switch 130 for switching between the recording and playback states, a first playback amplifier 131 which receives the playback signal via these switches and amplifies it, a first demodulating circuit 132 for demodulating the amplified signal, and similarly a second head switch 133, a sixth switch 134, a second playback amplifier 135, and a second demodulating circuit 136. The outputs of the first and second demodulating circuits 132 and 136 are applied to a separation circuit 137 for separating the playback signal into a video signal and an audio signal.

The separation circuit 137 is connected to a playback audio digital signal processing circuit 138 which receives the audio signal and provides outputs to a first number-of-playback-channels switch 139, a second number-of-playback-channels switch 140, a first digital-to-analog (hereinafter written D/A) converter 141 for converting the channel-1 audio signal to an analog signal, and similar second, third, and fourth D/A converters 142, 143, and 144 for channels 2, 3, and 4, respectively, the inputs to the third and fourth D/A converters 143 and 144 being switched by the first and second number-of-playback-channels switches 139 and 140. The outputs of the first to fourth D/A converters 145 to 148 are sent to a channel-1 audio signal output terminal 145, a channel-2 audio signal output terminal 146, a channel-3 audio signal output terminal 147, a channel-4 audio signal output terminal 148.

The video signal output from the separation circuit 137 is sent to a playback video digital signal processing circuit 149, then to a fifth D/A converter 150 for converting it to an analog signal, which is output at a video signal output terminal 151.

Figure 21:
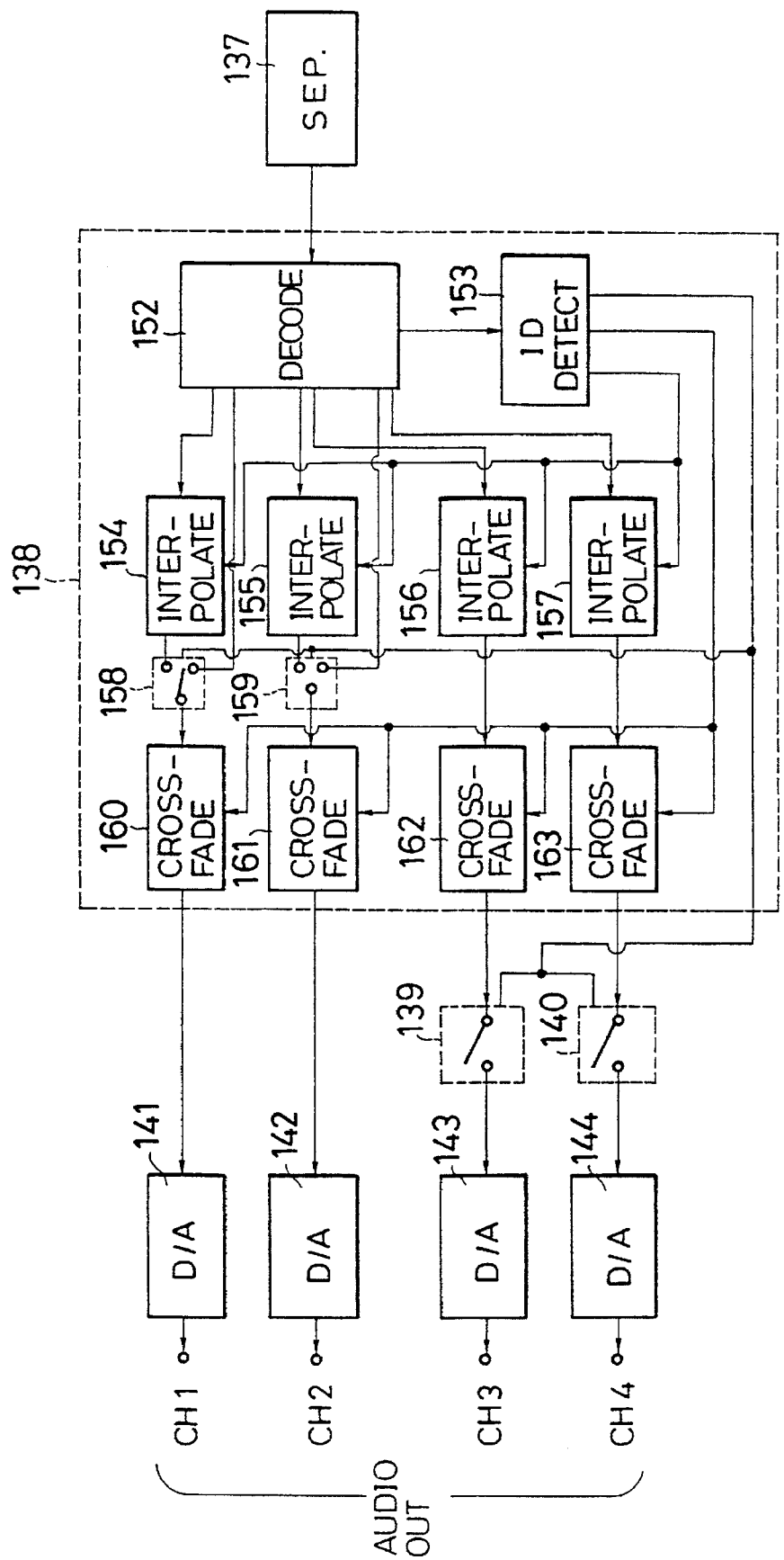
FIG. 21 is a more detailed block diagram of the playback audio digital signal processing circuit in FIG. 20.

FIG. 21 is a block diagram illustrating the detailed structure of the playback audio digital signal processing circuit 138. The audio signal from the separation circuit 137 is applied to a decoding circuit 152 for decoding the audio signal and detecting and correcting errors therein. Outputs from the decoding circuit 152 go to an ID detection circuit 153 for detecting ID information in the audio signal, a first interpolation circuit 154 for interpolating samples in channel 1, similar second, third, and fourth interpolation circuits 155, 156, and 157 for channels 2, 3, and 4, a third number-of-playback-channels switch 158, and a fourth number-of-playback-channels switch 159. The third and fourth number-of-playback-channels switches 158 and 159 are controlled by the ID detection circuit 153, and select either the outputs of the first and second interpolation circuits 154 and 155 or outputs received from the decoding circuit 152 for input to a first crossfading circuit 160 for crossfading signals in channel 1 and a second crossfading circuit 161 for crossfading signals in channel 2, respectively. The third and fourth interpolation circuits 156 and 157 are connected directly to similar third and fourth crossfading circuits 162 and 163 for crossfading signals in channels 3 and 4, respectively. The crossfading circuits 160 to 163 also receive signals from the ID detection circuit 153. The signals output by the first and second crossfading circuits 160 and 161 are applied directly to the first and second D/A converters 141 and 142, respectively. The signals output by the third and fourth crossfading circuits 162 and 163 are applied via the first and second number-of-playback-channels switches 139 and 140 to the third and fourth D/A converters 143 and 144, respectively.

Next the normal recording operation of this digital video tape recorder will be described for both the two- and four-channel cases. During recording, the first, second, third, and fourth switches 119, 120, 123, and 124 are in the on state, connecting the recording section 80 to the dual rotary heads 125 and 126, and the fifth and sixth switches 130 and 134 are set to the "Rec" position in FIG. 20, grounding the inputs to the playback section 90.

For two-channel operation, audio signals are input at the channel-1 audio signal input terminal 101 and the channel-2 audio signal input terminal 102 in FIG. 20 and digitized by the first and second A/D converters 105 and 106. The first number-of-recording-channels switch 109 and the second number-of-recording-channels switch 110 are both off, disconnecting the channel-3 and channel-4 inputs from the recording audio digital signal processing circuit 111. The recording audio digital signal processing circuit 111 thus receives the audio inputs for channels 1 and 2, as well as information from the sequence circuit 112 indicating that the input audio signal has two channels and that audio dubbing is not being performed.

For four-channel operation, audio signals are input at the channel-1 audio signal input terminal 1, the channel-2 audio signal input terminal 2, the channel-3 audio signal input terminal 3, and the channel-4 audio signal input terminal 4 and digitized by the first, second, third, and fourth A/D converters 105, 106, 107, and 108. The first number-of-recording-channels switch 109 and the second number-of-recording-channels switch 110 are both on, so the recording audio digital signal processing circuit 111 receives audio input signals from all four channels, as well as information from the sequence circuit 112 indicating that the input audio signal has four channels and that audio dubbing is not being performed.

The recording audio digital signal processing circuit 111 separates the even- and odd-numbered signal samples of the digitized audio signals, encodes them in an error-correcting code, adds the information from the sequence circuit 112 to the ID fields, and performs other processes, then sends the resulting audio signals to the mixing circuit 116. Meanwhile, the video signal is input at the video signal input terminal 113, digitized by the fifth A/D converter 114, encoded in an error-correcting code by the recording video digital signal processing circuit 115, and likewise sent to the mixing circuit 116.

The mixing circuit 116 multiplexes the audio signals and the video signal. The multiplexed signal is modulated by the first modulating circuit 117 and the second modulating circuit 121 and amplified by the first amplifier 118 and the second amplifier 122 to create the actual signal to be recorded on the tape.

The signal is recorded on the tape 1 alternately by the first dual rotary head 125 and the second dual rotary head 126. During one 360° rotation of the heads, the first rotary head 125 scans the tape 1 for the first 180°, recording two helical tracks in one segment, then the second rotary head 126 scans the tape 1 for the second 180°, recording the two helical tracks in the next segment. The signal for one of the two helical tracks in a segment comes from the first modulating circuit 117 and first amplifier 118; the signal for the other helical track in the same segment comes from the second modulating circuit 121 and second amplifier 122.

The recording audio digital signal processing circuit 111, the recording video signal processing circuit 115, and the mixing circuit 116 operate according to the novel recording method already described. Specifically, the recording audio digital signal processing circuit 111 processes the audio signals one audio frame at a time, and the recording video digital signal processing circuit 115 processes the video signal one video frame at a time, the audio frames being offset by one field from the video frames. In four-channel operation, the recording audio digital signal processing circuit 111 separates the even and odd samples of the audio signals in an audio frame and outputs them into different fields in that frame, each sample being recorded just once. In two-channel operation, the recording audio digital signal processing circuit 111 outputs the even and odd samples separately into each field in the frame, each sample being recorded twice, once in each field.

The outputs of the recording audio and video digital signal processing circuits 111 and 115 and the mixing circuit 116 are timed so that the audio signal is recorded in upper and lower tape edge audio sectors and the video signal is recorded in video sectors as illustrated in FIGS. 8 to 11. Details of this timing are omitted since they will be clear to one skilled in the art.

Next the normal playback operation of the digital video tape recorder will be described for the two- and four-channel cases. Normal playback refers to the playback of a tape that has not been edited. During playback, the first, second, third, and fourth switches 119, 120, 123, and 124 in FIG. 20 are in the off state, and the fifth and sixth switches 130 and 134 are set to the "PB" position, so the first and second dual rotary heads 125 and 126 are connected to the playback section 90 of the digital video tape recorder and disconnected from the recording section 80.

In playback, the first head switch 129 and the second head switch 133 in FIG. 20 are switched to input the signal from the first dual rotary head 125 and the second dual rotary head 126 alternately, the signal from each head being input while that head is scanning the tape 1. The signal thus read from the tape 1 is amplified by the first playback amplifier 131 or the second playback amplifier circuit 136, demodulated by the first demodulating circuit 132 or the second demodulating circuit 136, then input to the separation circuit 137 and separated into an audio signal and a video signal.

The video signal is input to the playback video digital signal processing circuit 149 which decodes it, corrects errors, and performs other processes, including a delay process to compensate for the longer processing time of the audio signal. The decoded video signal is converted to an analog signal by the fifth D/A converter 150 and output at the video signal output terminal 151.

The audio signal is input to the audio digital signal processing circuit 138 where first the decoding circuit 152 decodes it and corrects errors, and the ID detection circuit 153 detects the ID information which was added by the sequence circuit 112 when the signal was recorded. Part of the ID information indicates the number of channels. If the ID information indicates that there are four channels, the ID detection circuit 153 causes the third and fourth number-of-recording-channels switches 158 and 159 to select the outputs from the first and second interpolation circuits 154 and 155 for input to the first and second crossfading circuits 160 and 161. If the ID information indicates two channels, the ID detection circuit 153 causes the third and fourth number-of-recording-channels switches 158 and 159 to select outputs from the decoding circuit 152 for input to the first and second crossfading circuits 160 and 161.

For a four-channel signal, if the decoding circuit 152 encounters an uncorrectable error in the even samples for channel 1, for example, commands from the decoding circuit 152 and ID detection circuit 153 instruct the first interpolation circuit 154 to reconstruct those even samples by interpolation from the odd samples. For a two-channel signal, which is recorded twice at different edges of the tape, if the decoding circuit detects an uncorrectable error in one copy of the audio signal in channel 1, for example, commands from the decoding circuit 152 and the ID detection circuit 153 instruct the first crossfading circuit 160 to select the other copy. Errors in other channels are corrected similarly.

Since the tape has not been edited, no audio-dubbing flags are recorded in the ID fields. When the ID detection circuit 153 does not detect an audio-dubbing flag, it directs the first, second, third, and fourth crossfading circuits 160, 161, 162, and 163 not to perform crossfading. The audio signals thus pass through the crossfading circuits unaltered to the first and second D/A converters 141 and 142 and the first and second number-of-playback-channels switches 139 and 140.

The ID detection circuit 153 also controls the first and second number-of-playback-channels switches 139 and 140, switching them on when there are four channels and off when there are only two channels. The third and fourth D/A converters 43 and 44 thus receive channels 3 and 4 of a four-channel signal, and do not receive any input for a two-channel signal. A four-channel audio signal is therefore output at the channel-1 audio signal output terminal 145, the channel-2 audio signal output terminal 146, the channel-3 audio signal output terminal 147, and the channel-4 audio signal output terminal 148, while a two-channel audio signal is output at the channel-1 audio signal output terminal 145 and the channel-2 audio signal output terminal 146.

The novel digital video tape recorder thus uses the same record and playback circuits to process both two- and four-channel audio signals, only simple switching operations being necessary to switch between the two- and four-channel modes. In playback, switching between two- and four-channel operation is furthermore automatic, controlled by a number-of-channels flag recorded in the audio signal. In four-channel operation, the interpolation circuits can recover an audio signal even if half of it is lost due, for example, clogging of one of the two dual rotary heads. In two-channel operation, a selection process performed in the crossfading circuits provides the same protection without requiring interpolation, enabling the audio signal to be recovered with no loss of information. The ability of this digital video tape recorder to record a two-channel audio signal twice at different edges of the tape, using different dual rotary heads, and select the signal frown either edge in playback makes both the recording and playback processes extremely reliable.

Next the operation of the novel digital video tape recorder during audio dubbing will be described with reference to FIG. 22.

To dub a new audio signal onto a target tape, the operator begins by playing back the target tape until he finds the video frame at which he wants to begin dubbing. During this phase the digital video tape recorder operates entirely in the playback mode, so that the existing audio signal can be heard. The operator then switches to the dubbing mode, in which the digital video tape recorder inputs a new audio signal and records it in the audio sectors, overwriting the old audio signal, while continuing to play back the video signal from the video sectors.

FIG. 22 shows the transition from the playback mode to the dubbing mode in more detail. The operator decides to start dubbing at the video frame including field n. The first audio frame is input while the dual rotary heads are scanning fields n and n+1 and processed by the recording audio digital signal processing circuit 111 while the heads are scanning fields n+2 and n+3, the data thus generated being output from the recording section of the digital video tape recorder while the heads are scanning fields n+4 and n+5. Recording, however, does not begin until the video frame comprising fields n+5 and n+6.

Specifically, the digital video tape recorder switches briefly to the recording mode to record the audio sectors located at the end of field n+5 and the beginning of field n+6. For a four-channel audio signal, the odd samples of the first audio frame are recorded in field n+5. For a two-channel audio signal, both the even and odd samples of the first audio frame are recorded in field n+5. To mark the transition from the old audio signal to the new, the sequence circuit 112 adds an audio-dubbing flag to the ID information recorded in field n+5.

The next new audio signal frame is input while the dual rotary heads are scanning Fields n+2 and n+3, processed in fields n+4 and n+5, and output and recorded in fields n+6 and n+7. For a four-channel audio signal, the even samples are recorded in field n+6 and the odd samples in field n+7. For a two-channel audio signal, the entire signal is recorded once in frame n+6 and once again in frame n+7. Audio dubbing continues in this way, each audio frame being recorded in two fields, which are located in separate video frames.

If the operator decides to stop audio dubbing after four video frames, for example, then the last audio frame is recorded in field n+10 but not in field n+11. For a four-channel audio signal, the even samples of the last audio frame are recorded in field n+10. For a two-channel audio signal, both the even and odd samples of the first audio frame are recorded once in field n+10. The sequence circuit 112 records another audio-dubbing flag in the ID information in field n+10.

Next the playback of an edited tape will be described. For frames in which no audio-dubbing flag is detected, playback of an edited tape is the same as the normal playback process, so the description will be limited to audio frames in which an audio-dubbing flag is recorded. Separate descriptions will be given for the two-and four-channel cases.

In the four-channel case, when the ID detection circuit 153 detects an audio-dubbing flag, it commands the first, second, third, and fourth interpolation circuits 154, 155, 156, and 157 to interpolate the two fields of the current audio frame separately, thereby generating the old audio signal from one field and the new audio signal from the other field. The first, second, third, and fourth crossfading circuits 160, 161, 162, and 163 are commanded to crossfade the old audio signal with the new audio signal in this frame. The result is the operation illustrated in FIGS. 18A and 18B, providing a smooth transition from the old audio signal to the new, or from the new audio signal to the old.

In the two-channel case, when the ID detection circuit 153 detects an audio-dubbing flag, it commands the first and second crossfading circuits 161 and 162 to crossfade the two fields of the current audio frame, which are obtained directly from the decoding circuit 152 in this case. Since one field contains the complete old audio signal and the other field contains the complete new audio signal, the result is again a smooth transition between the old and new audio signals, as illustrated in FIGS. 19A and 19B.

By marking audio dubbing with an audio-dubbing flag recorded at the edit points and crossfading the old and new audio signals when this flag is detected during playback, the novel digital video tape recorder creates a natural transition between the old and new audio signals, without requiring external noise countermeasures.

The scope of this invention is not limited to the embodiments shown in the preceding drawings, but includes numerous modifications and variations which will be obvious to one skilled in the art. For example, the audio and video frames can be divided into snore than two fields each, as long as an appropriate offset is provided between the audio and video frames. The audio signal can be recorded in more than two segments per frame. Furthermore, the audio sectors need not be located near the edges of the tape, as long as they are located in different positions with respect to the width of the tape. The crossfade time need not be limited to one frame at the edit points; the new and old audio signals can be crossfaded for two or more audio frames to provide an even smoother transition between them. Audio dubbing flags can be recorded not just during audio dubbing but in any type of editing that replaces an old audio signal with a new audio signal. Moreover, audio dubbing flags can be recorded in all dubbed audio fields instead of just the first and last, in which case the new audio signal may be crossfaded with itself in interior audio frames.

What is claimed is:

1. A digitally recorded tape having multi-channel audio and video signals recorded thereon in helical tracks, for reproduction of the recorded multichannel audio and video signals in a tape reproducing apparatus, each audio channel having an audio signal associated therewith which is divided into odd and even digital samples, comprising:

a plurality of helical tracks each having at least one of audio and video information recorded thereon, each track with audio information recorded thereon including an audio sector and each track with video information recorded thereon including a video sector;

each said audio sector being disposed on only one end of each helical track adjacent an edge of the tape; and each said audio sector storing, adjacent one edge of the tape, only one of said odd digital samples and said even digital samples of an audio channel or storing, adjacent the other edge of the tape, opposite the one edge, only the other of said odd digital samples and said even digital samples of the audio channel.

2. The tape of claim 1 wherein said audio and video information are arranged on the tape in information frames, each audio information frame overlapping two adjacent video information frames.

3. The tape of claim 1, wherein each helical track including an audio sector includes only one of a first type audio sector and a second type audio sector wherein, said even samples are stored in said first type audio sector disposed on only a first end of each helical track adjacent a first edge of the tape and said odd samples are stored in said second type audio sector disposed on only a second end of each helical track adjacent a second edge of the tape, opposite the first edge.

4. The tape of claim 1 wherein said helical tracks are arranged in track pairs of adjacent tracks, tracks of said track pairs having said audio sectors thereof disposed on only the same edge of the tape.

5. The tape of claim 4 wherein adjacent track pairs which have audio information recorded thereon have their associated audio sectors disposed on opposite edges of the tape so that alternate track pairs having audio signals have their associated audio sectors disposed on the same edge of the tape.

6. The tape of claim 1 wherein a single audio frame is formed by a pair of track pairs, each track pair including two tracks, separated by tracks containing only video signals.

7. The tape of claim 6 wherein even samples of a first two channels are disposed on audio sectors of each track of a first track pair having audio signals provided thereon while the odd samples of another two channels, each different from the first two channels, are disposed on audio sectors of a second track pair having audio signals provided thereon nearest to the first track pair.

8. The digitally recorded tape of claim 1, wherein each said audio sector includes first and second audio subsectors, wherein audio subsectors of a single helical track store samples of different audio channels.

9. The digitally recorded tape of claim 8, wherein said odd digital samples are recorded on different tracks from any of said even digital samples.

10. The digitally recorded tape of claim 9, wherein said audio and video information are arranged on the tape in information frames, each audio information frame overlapping two adjacent video information frames.

11. A digitally recorded tape having video signals and audio signals recorded thereon, for reproduction of the recorded audio and video signals in a tape reproducing apparatus, said video signals being arranged in frames, each representative of individual video images comprising:
   a tape;
   a plurality of tracks having video signals and audio signals recorded thereon provided on said tape, each frame of said video signals including more than one track;
   said audio signals corresponding to each frame of said video signals being recorded on the tape in audio track areas, formed at only end portions of two separate tracks within a frame of said video signals, on less than all of the tracks corresponding to said frame of said video signals,
   at least a portion of said video signals being recorded in track areas, positionally corresponding to said audio track areas, on tracks not having audio signals recorded thereon.

12. The tape of claim 11 wherein said audio signals are provided on said tape as a plurality of digital audio samples which are divided into odd samples and even samples.

13. The tape of claim 12 wherein said frames are video frames;
   said audio information being arranged in audio frames, each audio frame including a plurality of tracks;
   at least some of said tracks being part of both a video frame and an audio frame and having both video and audio signals recorded thereon;
   said video frames and said audio frames being arranged in an interleaved manner so that audio signals of a audio frame are on tracks corresponding to more than one video frame, thereby enabling improved audio dubbing.

14. The tape of claim 13 wherein each said audio frame includes audio signals of both even samples and odd samples;
   for each audio frame, said even samples and odd samples being provided in different video frames.

15. The tape of claim 13 wherein said audio signals are recorded in audio sectors of individual tracks.

16. The tape of claim 11 wherein the increased audio information within a single track increases information storage efficiency.

17. The tape of claim 11 wherein the tracks having audio information recorded thereon are arranged in track pairs, a track pair having a sample of each channel of the multi-channel audio signals recorded thereon.

18. The tape of claim 17 wherein even samples of two channels and the odd samples of another two channels, different from the first two channels, are recorded in the audio subsectors of one track pair.

19. The tape of claim 18 wherein adjacent track pairs having audio signals provided thereon have their associated audio sectors disposed only near opposite edges of the tape so that alternate track pairs having audio signals provided thereon have their associated audio sectors disposed on the same edge of said tape.

20. The tape of claim 19 wherein a single audio frame is formed by a pair of track pairs, each track pair including two tracks, separated by tracks containing only video information.

21. The tape of claim 11 wherein said tracks are helically arranged on said tape.

22. The tape of claim 11 wherein said audio information includes four channel sound information, said four channel sound information being provided on said tape using error correction coding but without any audio information redundancy.

23. The tape of claim 11 wherein said video signals are provided on all said tracks.

24. The tape of claim 11 wherein said audio information is provided on only one end of each said track containing audio information.

25. The digitally recorded tape of claim 13, wherein the audio track areas, containing said recorded digital audio signals on less than all of the tracks corresponding to the audio frame, are located at an end of a track proximate to an edge of the tape.

26. The digitally recorded tape of claim 13, wherein the digital audio signals are recorded at opposite tape edges of different tracks within both a video frame and an audio frame.

27. A digitally recorded tape for reproduction in a tape reproducing apparatus, comprising:
   a tape; and a plurality of tracks recorded on said tape, said tracks being arranged in video frames representative of individual images and audio frames, each frame having a plurality of tracks, wherein one input video frame of input video data corresponds to one audio frame of input audio data;

at least some of said tracks being part of both a video frame and an audio frame and having video and audio signals recorded thereon;

said video frame and said audio frame being interleaved so that audio signals of an audio frame are on tracks of more than one video frame.

28. The tape of claim 27 wherein said audio signals are provided on said tape as a plurality of digital audio samples which are divided into odd samples and even samples.

29. The tape of claim 28 wherein each audio frame includes both even samples and odd samples;

for each audio frame, said even samples and odd samples being provided in different video frames.

30. The tape of claim 28 wherein said audio signals are recorded in audio sectors of individual tracks.

31. The tape of claim 28 wherein the tracks having audio information recorded thereon are arranged in track pairs, a track pair having a sample of each channel recorded thereon.

32. The tape of claim 31 wherein even samples of two channels and the odd samples another two channels, different from the first two channels, are recorded in the audio subsectors of one track pair.

33. The tape of claim 32 wherein adjacent track pairs having audio signals provided thereon have their associated audio sectors disposed on only opposite edges of the tape so that alternate track pairs having audio signals provided thereon have their associated audio sectors disposed on the same edge of said tape.

34. The tape of claim 33 wherein a single audio frame is formed by a pair of track pairs, each track pair including two tracks, separated by tracks containing only video information.

35. The tape of claim 27 wherein said tracks are helically arranged on said tape.

36. The tape of claim 27 wherein said audio information includes four channel sound information, said four channel sound information being provided on said tape using error correction coding but without any audio information redundancy.

37. The tape of claim 27 wherein said video signals are provided on all said tracks.

38. The tape of claim 27 wherein said audio information is provided on only one end of each track containing audio information.

39. The tape of claim 27 wherein each audio frame is divided substantially equally between tracks which are part of adjacent video frames.

40. A digitally recorded tape having multichannel audio and video signals recorded thereon in helical tracks, for reproduction of the recorded multi-channel audio and video signals in a tape reproducing apparatus, each audio channel having an audio signal associated therewith which is divided into odd and even digital samples, comprising:

a plurality of helical tracks each having at least one of audio and video information recorded thereon, each track with audio information recorded thereon including an audio sector and each track with video information recorded thereon including a video sector;

each said audio sector being disposed on only one end of each helical track adjacent an edge of the tape, said helical tracks being arranged in track pairs of adjacent tracks, each said track of said track pairs including said audio sector disposed adjacent a common edge of the tape, one track of the track pairs including said audio sector storing only odd digital samples of an audio channel and the other track including said audio sector storing only even digital samples of an audio channel, wherein a first track pair includes tracks with said audio sector disposed adjacent only a single first edge of the tape and a second track pair, proximate to the first track pair, includes tracks with said audio sector disposed adjacent only a single second edge of the tape, opposite the first edge.

41. The digitally recorded tape of claim 40, wherein each said audio sector includes first and second audio subsectors, audio subsectors of a single helical track storing samples of different audio channels.

42. The digitally recorded tape of claim 41, wherein said odd digital samples are recorded on different tracks from any of said even digital samples.

43. The digitally recorded tape of claim 42, wherein said audio and video information are arranged on the tape in information frames, each audio information frame overlapping two adjacent video information frames.

* * * * *